(12) United States Patent
Deering

(10) Patent No.: US 6,256,041 B1
(45) Date of Patent: Jul. 3, 2001

(54) DECOMPRESSION OF THREE-DIMENSIONAL GEOMETRY DATA REPRESENTING A REGULARLY TILED SURFACE PORTION OF A GRAPHICAL OBJECT

(75) Inventor: Michael F. Deering, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/096,063

(22) Filed: Jun. 11, 1998

Related U.S. Application Data

(63) Continuation-in-part of application No. 08/988,202, filed on Sep. 18, 1997, now abandoned, which is a continuation-in-part of application No. 08/885,279, filed on Jun. 30, 1997, now abandoned, which is a continuation-in-part of application No. 08/511,294, filed on Aug. 4, 1995, now Pat. No. 5,793,371.

(51) Int. Cl.$^7$ .................................................. G06T 17/00
(52) U.S. Cl. ............................................ 345/426; 345/419
(58) Field of Search ................................... 345/418, 419, 345/426, 430, 431, 423

(56) References Cited

U.S. PATENT DOCUMENTS

| | | |
|---|---|---|
| 4,930,092 | 5/1990 | Reilly . |
| 5,142,635 | 8/1992 | Saini . |
| 5,408,605 | 4/1995 | Deering . |
| 5,485,559 | 1/1996 | Sakaibara et al. . |
| 5,517,611 | 5/1996 | Deering . |
| 5,537,551 | 7/1996 | Denenberg et al. . |
| 5,671,401 | 9/1997 | Harrell . |

(List continued on next page.)

FOREIGN PATENT DOCUMENTS

| | | |
|---|---|---|
| 0 536 801 A2 | 4/1993 | (EP) . |
| 0 594 304 A2 | 4/1994 | (EP) . |
| 0 757 332 A2 | 2/1997 | (EP) . |
| 2 302 002 | 12/1996 | (GB) . |
| 90/06647 | 6/1990 | (WO) . |

OTHER PUBLICATIONS

"Nonpolygonal Isosurface Rendering for Large Volume Data Sets," J.W. Durkin and J.F. Hughes, 1070–2385/94, 1994, IEEE, pp. 293–300.

(List continued on next page.)

Primary Examiner—Mark Zimmerman
Assistant Examiner—Cliff N. Vo
(74) Attorney, Agent, or Firm—Conley, Rose & Tayon, PC

(57) ABSTRACT

Methods and systems for compressing and decompressing 3-D geometry data which includes regularly tiled surface portions. One compression method includes representing a surface portion as a "vertex raster" by specifying an extent value and encoding the vertex parameter values of vertices within the surface portion. The extent value specifies the arrangement of vertices within the surface portion and allows the vertices to be properly assembled into drawing primitives during decompression. The encoded vertex parameter values (such as position, color, normals, z-displacement values, texture map coordinates, and surface material properties) may be encoded globally (by setting initial values and corresponding delta values), locally (on a per-vertex basis), or using a combination of these techniques. Absolute, delta, or delta-delta encoding may be utilized for these parameter values. Connectivity information may also be encoded using this compression method by specifying quad split bits and half-resolution edges. For graphical objects which include a plurality of adjacent surface portions, a step command may be used to allow reuse of data for more than one surface.

51 Claims, 22 Drawing Sheets

U.S. PATENT DOCUMENTS

| | | |
|---|---|---|
| 5,740,281 | 4/1998 | Hirai . |
| 5,751,865 | 5/1998 | Micco et al. . |
| 5,798,762 | 8/1998 | Sfarti et al. . |
| 5,801,711 | 9/1998 | Koss et al. . |
| 5,842,004 | 11/1998 | Deering et al. . |
| 5,867,167 | 2/1999 | Deering . |
| 5,870,094 | 2/1999 | Deering . |

OTHER PUBLICATIONS

"Sun Breaks the Bottlenecks," Bill Fleming, BYTE, Nov. 1993, pp. 218, 222, 224.

"The Triangle Processor and Normal Vector Shader: A VLSI System for High Performance Graphics," Deering, et al., Computer Graphics, vol. 22, No. 4, Aug. 1988, 5 pages.

"Higher Bandwidth," John Danskin, Princeton Univ. Dept. of Computer Science, Association of Computer Machinery, Multimedia 94–10/94, 1994, ACM–0–89791–686–794/0010, pp. 89–96.

"Geometry Compression," Michael Deering, Sun Microsystems, Siggraph 95, Computer Graphics Proceedings, Annual Conference Series 1995, ACM–0–89791–701–4/95/008, pp. 13–20.

Computer

SetVertexRasterSize
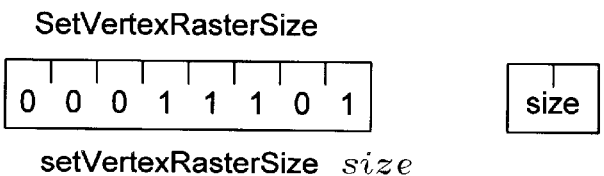
setVertexRasterSize *size*
FIG. 7
SetVertexRasterStart         (i=0,2,3,4)
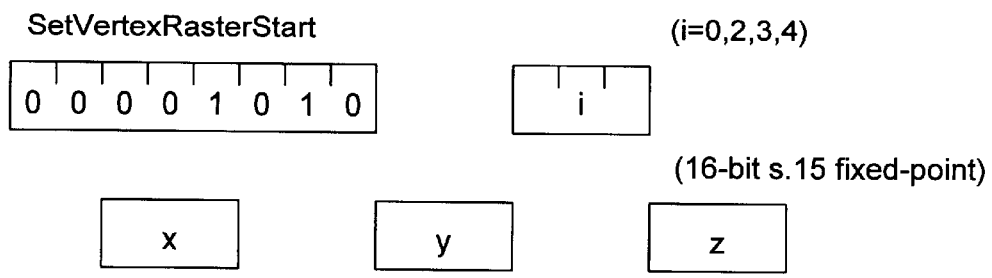
(16-bit s.15 fixed-point)
SetVertexRasterStart
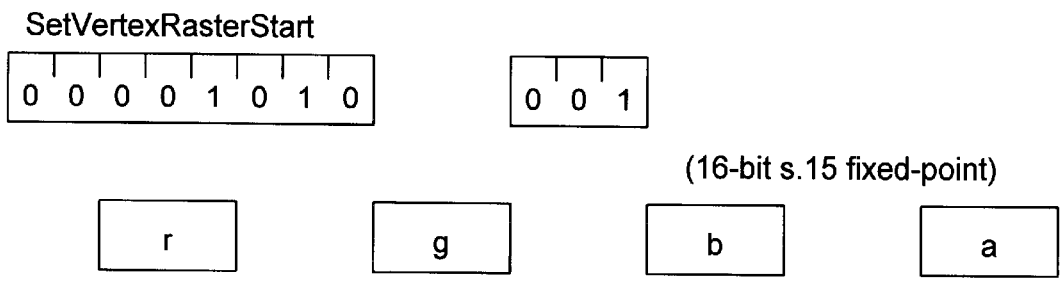
(16-bit s.15 fixed-point)
setVertexRasterStart *ixyz*
setVertexRasterStart *1rgba*
FIG. 8

ExecuteVertexRaster

| 0 | 0 | 0 | 0 | 0 | 0 | 1 | 0 | _raster of vertex data_ | execute VertexRaster  *raster of vertex data_*

FIG. 12A

ExecuteVertexRasterIndirect

| 0 | 0 | 0 | 0 | 0 | 0 | 1 | 1 | 32-bit address | execute VertexRasterIndirect *Address*

FIG. 12B

ExecuteVertexRaster32Indirect

| 0 | 0 | 0 | 0 | 0 | 1 | 0 | 0 | 32-bit address |

| 32-bit stride | execute VertexRaster32Indirect *Address Stride*

FIG. 12C

SetState

| 0 | 0 | 0 | 1 | 1 | 0 | dde | bnv |

| bcv | cap | qsp |

FIG. 13A

SetState2

| 0 | 0 | 0 | 1 | 1 | 1 | 1 | 0 |

| scp | tex | tx2 | psrc | vr1 | vr2 | vr3 | vr4 |

FIG. 13B

StepVertexRaster

| 0 | 0 | 0 | 1 | 1 | 1 | 1 | 1 |

| dir | stepVertexRaster *dir*

FIG. 14

SetEdgeHalfRez

| 0 | 0 | 0 | 1 | 1 | 1 | 0 | 0 |

| el | et | er | eb | setEdgeHalfRez *el et er eb*

DECOMPRESSION OF THREE-DIMENSIONAL GEOMETRY DATA REPRESENTING A REGULARLY TILED SURFACE PORTION OF A GRAPHICAL OBJECT

CONTINUATION DATA

This application is a continuation-in-part of U.S. application Ser. No. 08/988,202, entitled "Compression of Three-Dimensional Geometry Data Representing a Regularly Tiled Surface Portion of a Graphical Object" by Michael F. Deering, filed Sep. 18, 1997, now abandoned, and assigned to assignee of this application, which is a continuation-in-part of U.S. application Ser. No. 08/885,279, entitled "System and Method for Generalized Geometric Compression of Three-Dimensional Graphics Data Having Regular Vertex Structures" by Michael F. Deering, filed on Jun. 30, 1997, now abandoned, and assigned to the assignee of this application, which is a continuation-in-part of application Ser. No. 08/511,294, entitled "Method And Apparatus For Geometric Compression Of Three-Dimensional Graphics Data" by Michael F. Deering, filed Aug. 4, 1995 now U.S. Pat. No. 5,793,371, and assigned to the assignee of this application.

CROSS-REFERENCE TO RELATED APPLICATIONS

U.S. application Ser. No. 08/511,294, entitled "Method And Apparatus For Geometric Compression Of Three-Dimensional Graphics Data" by Michael F. Deering, filed Aug. 4, 1995.

U.S. application Ser. No. 08/511,326, entitled "Method and Apparatus for Decompression of Compressed Geometric Three-Dimensional Graphics Data" by Michael F. Deering and Aaron S. Wynn, filed Aug. 4, 1995.

U.S. application Ser. No. 08/885,279, entitled "System and Method for Generalized Geometric Compression of Three-Dimensional Graphics Data Having Regular Vertex Structures" by Michael F. Deering, filed on Jun. 30, 1997.

U.S. application Ser. No. 08/988,202, entitled "Compression of Three-Dimensional Geometry Data Representing a Regularly Tiled Surface Portion of a Graphical Object" by Michael F. Deering, filed Sep. 18, 1997.

U.S. application entitled "Compression of Three-Dimensional Geometry Data Representing a Regularly Tiled Surface Portion of a Graphical Object" by Michael F. Deering filed concurrently herewith application Ser. No. 09/095,777 filed Jun. 11, 1998 now U.S. Pat. No. 6,215,500.

FIELD OF THE INVENTION

The present invention relates generally to compressing and decompressing three-dimensional graphics data, and more particularly to compressing and decompressing three-dimensional geometry data corresponding to regularly tiled surface portions of graphical objects.

DESCRIPTION OF THE RELATED ART

Three-dimensional (3-D) computer graphics systems employing large geometric models find wide use in applications such as computer-aided design (CAD), virtual reality environments, training and simulation programs, games, and location-based entertainment. Such systems typically include a 3-D graphics accelerator, a specialized rendering subsystem which is designed to off-load graphics processing functions from the host processor, thereby improving system performance. In a system with a 3-D graphics accelerator, an application program executing on the host processor generates three-dimensional geometry data including information corresponding to points on the surface of a three-dimensional graphical object. These points are usable as vertices of polygons which, when connected, may be rendered to form a representation of the graphical object. The application program causes the host processor to transfer this 3-D geometry data to the graphics accelerator, along with corresponding control and connectivity information. The graphics accelerator receives this stream of compressed 3-D geometry data, and renders the encoded polygons on an attached display device.

The process of connecting three-dimensional vertices to form a representation of a graphical object is referred to as "tiling". FIGS. 1A and 1B each illustrate graphical objects which have been tiled into component polygons. As shown, FIG. 1A depicts a 3-D lion 60, while FIG. 1B depicts a 3-D giraffe 70. It is noted that lion 60 is primarily tiled into triangles, while giraffe 70 is tiled using quadrilaterals. Tiling may be performed using a variety of different polygons.

This transmission of graphics primitives and commands from the host processor to the graphics accelerator over the system bus is one of the major bottlenecks in computer graphics. This bottleneck is becoming more problematic as users of graphics applications programs require an ever-increasing amount of complexity (and hence, size) in the geometric models used to produce visualization effects. The result is that slow memory subsystems or slow bus subsystems may not be able to adequately supply geometry data to the relatively fast real-time rendering hardware, thereby compromising system performance. The size requirements for a large set of geometric data may also cause memory constraints.

For example, rendering a large geometric data set with one million triangles at 30 Hz requires a system bus throughput of approximately 720 MB/sec (at a ratio of 24 bytes/triangle). While such high bus bandwidths may be attainable for high-end systems, low-end to mid-range systems typically have bandwidths on the order of 250–320 MB/sec. The performance of lower cost systems is thus effected by the throughput of the system bus as geometry processing requirements increase.

Techniques such as polygon simplification and visibility culling have been used to manage such large sets of geometry data. Polygon simplification allows an object to be viewed at different levels of detail, in relation to the viewing distance from the object. Visibility culling involves stripping away invisible portions of an object from the drawing loop. These techniques, however, are not efficient when most of a given object is visible and high resolution is desired. In such cases, the full amount of geometry data must be transferred from the host processor to the rendering hardware on the graphics accelerator.

Applicant's co-pending U.S. application Ser. No. 08/511, 294, however, discloses methods and systems for compression and decompression of 3-D geometry data. If the compression is performed as a pre-process, the geometry data may be stored in main memory of the computer system in compressed format. Upon rendering, geometry data is transferred directly to graphics hardware in this compressed format. Decompression may be performed off-line in software or real-time in hardware or software.

Compression performed according to the manner described in the Applicant's parent patent application may result in a 6× to 10× reduction in size of the geometry data.

The bus bandwidth required to transfer this data is therefore reduced as well. High-performance graphics thus becomes much more attainable for lower-cost graphics platforms.

However, Applicant's previously disclosed compression techniques are generalized to support compression of 3-D geometry data for surface portions which are tiled in an irregular fashion. Although this patent application discloses efficient compression techniques and devices, no provisions are made for taking advantage of greater compression efficiency possible for surfaces where polygons are connected in a regular manner. That is, while the compression techniques previously disclosed may be applied to regularly tiled surface portions, the compression efficiency achieved is not optimal.

Consider the 3-D lion 60 depicted in FIG. 1A. The surface of the lion 60 (comprising triangles and rectangles) is tiled such that little regularity exists between neighboring primitives. Accordingly, the compression techniques disclosed in patent application Ser. No. 08/511,294 achieve a suitable or near-optimal level of compression for triangle strips arranged in an irregular fashion.

Consider the 3-D giraffe 70 of FIG. 1B, however. While portions such as the head of giraffe 70 are irregularly tiled (and thus suited to the previously disclosed compression techniques), the neck and parts of the body of the giraffe 70 are tiled in a fairly regular fashion. For such regularly tiled surface portions, there is a need for techniques and devices which take advantage of the regular arrangement of surface polygons to achieve greater compression efficiency. Such compression techniques and devices should preferably be compatible or usable with existing compression/decompression techniques.

SUMMARY OF THE INVENTION

The present invention comprises a system and method for compressing 3-D geometry data corresponding to a regularly tiled surface portion of a three-dimensional object. In one embodiment, the method comprises receiving 3-D geometry data which includes vertex parameter values corresponding to vertices within the regularly tiled surface portion. These vertex parameter values may include position, color (including specular color), normals, bump and displacement mapping basis vectors, quad split information, and texture mapping coordinates. The method next includes representing the surface portion in a compressed format referred to as a "vertex raster".

Representing a surface portion as a vertex raster first includes encoding an extent value for the surface portion which defines an arrangement of the vertices to be compressed. The extent value may specify the number of vertices along with the dimensions of a regular grid of vertices within the surface portion. Furthermore, the extent value may specify connectivity information for the vertices. In one embodiment, neighboring vertices may be connected to form quadrilaterals (which are further split into triangles for compression purposes). In yet another embodiment, neighboring vertices may be connected to form other polygons (hexagons, for example). Generally speaking, the extent value is selected to best fit the connectivity of the vertices being compressed. In a preferred embodiment, the extent value specifies that the regularly tiled surface portions includes vertices arranged in a square grid that is one of a plurality of predefined sizes.

The compression method next comprises encoding vertex parameter values corresponding to vertices within the regularly tiled surface portion. Vertex parameter values may be encoded globally, locally, or using a combination of global and local values. Global specification of a vertex parameter includes setting an initial value for the parameter along with an indication of how the parameter changes value across the surface portion. In one embodiment, this indication of change is specified by setting one or more delta values. In another embodiment, a function may be specified which is usable to compute the vertex parameter value at each vertex within the surface portion.

Vertex parameter values may also be encoded locally, on a per-vertex basis. In one embodiment, control bits are set which indicate what type of vertex parameters are to be encoded in the per-vertex data stream. This allows the per-vertex data stream to be encoded without the need for stop bits which specify the end of the stream. Locally specified values may be encoded by a variety of techniques, including absolute values, delta-encoded values, and delta-delta encoded values.

Global and local specification of parameter values may also be combined advantageously. A vertex raster representing one surface portion, for example, may use global specification of position and local specification of color values. Furthermore, global and local specification may also be used for the same parameter. For example, a locally specified z-displacement value may be used in combination with a globally specified position value to perform displacement texturing (which is used to simulate wrinkles or bumps on the surface of a graphical object).

In an embodiment in which the extent value is one of a number of predetermined sizes, these predetermined sizes may not be large enough to represent a given surface portion. In such cases, a step command may be utilized to re-use the global parameters of one vertex raster with newly specified per-vertex data. In one embodiment, a step command includes a value which indicates the direction of the new surface portion relative to the previously specified surface portion. Use of the step command may increase compression efficiency since global data does not need to be re-specified.

In one embodiment, the extent value of a surface portion specifies that neighboring vertices are arranged in a regular grid. These neighboring vertices are usable to form a plurality of quadrilaterals, which each may be further divided into a pair of triangles for rendering. For a given quadrilateral, there are two possible ways to perform this division. If no connectivity is specified for a quadrilateral within a surface portion, a default tessellation is performed in one embodiment. In an alternate embodiment, tessellation may be performed on a quad-by-quad basis through the use of an explicit split bit, which indicates the manner in which a particular quadrilateral is to be divided. Performing tessellation on a per-quadrilateral basis may lead to reduced visual artifacts and "jagginess" in rendered images.

Another common artifact in 3-D images occurs when a surface portion represented in a given resolution is adjacent to a surface portion represented in a lower resolution. This results in a visually unappealing and unrealistic image. To diminish this effect, a surface portion represented as a vertex raster may include one or more edges represented in half-resolution mode. In this mode, the one or more edges provide an area of intermediate resolution between the two surface portions. This provides a smoother flow in the resultant image.

The present invention also comprises a system and method for decompressing compressed 3-D geometry which represents regularly tiled surface portions. In one embodiment, the decompression method first includes receiving the 3-D geometry data which includes an extent value and encoded vertex parameter values. The method next includes receiving initial values for globally specified vertex parameters, followed by receiving one or more corresponding delta values. These delta values indicate how the vertex parameters change value across the surface portion being represented. In one embodiment, these one or more delta values are applied according to a vertex traversal order specified by the extent value.

Next, the method includes receiving a stream of per-vertex (local) data, which includes one or more vertex parameter values for each vertex. These values may be encoded as absolute values, delta-encoded values, or delta-delta encoded values. The method includes accessing the vertex parameter values for a current vertex (which typically begins with a predetermined initial vertex). The method then includes generating final parameter values for the current vertex using globally specified values, locally specified values, or both.

During decompression, vertex parameter values for selected vertices are stored into a mesh buffer for use in forming subsequent primitives. The selected vertices are typically determined according to the decoded extent value. In a surface portion which includes a regular grid of vertices, for example, all vertices on the bottom row of the grid are initially stored into the mesh buffer without forming any drawing primitives in one embodiment. These stored values are then accessed during traversal of the next row of vertices in order to form a plurality of geometric primitives.

After generating final vertex parameter values for the current vertex, a determination is made as to whether one or primitives are to be assembled using the current vertex. If no explicit connectivity information is supplied, drawing primitives are generated according to a predetermined default connectivity. If connectivity is explicitly defined in the compressed data, however, primitives are generated accordingly. In one embodiment, this connectivity information includes quad split bits which indicate a tessellation direction for a quadrilateral region formed by neighboring vertices within the represented surface portion. One or more primitives may be formed from a given current vertex value.

The method continues with selecting a next vertex to be the new current vertex. This includes accessing the vertex parameter values for the new current vertex from the per-vertex data stream. The method then continues as described above until the last vertex (typically predetermined by the vertex traversal order) is reached.

The present invention thus provides efficient systems and methods for compression and decompression of 3-D geometry data corresponding to regularly tiled surface portions.

BRIEF DESCRIPTION OF THE DRAWINGS

A better understanding of the present invention can be obtained when the following detailed description of a preferred embodiment is considered in conjunction with the following drawings, in which:

FIG. 7 depicts the format of a command to set the size of a surface portion according to a preferred embodiment of the present invention;

FIG. 8 depicts the format of a command to initialize parameters to be interpolated across the surface portion according to a preferred embodiment of the present invention;

FIGS. 12A–C depict the format of commands which specify streams of per-vertex data according to a preferred embodiment of the present invention;

FIGS. 13A–B depict the format of command which set mode bits used in geometry compression and decompression according to a preferred embodiment of the present invention;

FIG. 14 depicts the format of a step vertex raster command according to a preferred embodiment of the present invention;

DETAILED DESCRIPTION OF THE EMBODIMENTS

Incorporation by Reference

Co-pending U.S. application Ser. No. 08/511,294, filed Aug. 4, 1995, entitled "Method and Apparatus for Geometric Compression of Three-Dimensional Graphics Data", issued as U.S. Pat. No. 5,793,371, on Aug. 11, 1998, and assigned to the assignee of this application, is hereby incorporated by reference as though fully and completely set forth herein.

Co-pending U.S. application entitled "Method of Producing a Sequence of Triangles From a Vertex Raster With and Without Half Resolution Edges While Decompressing a Compressed Geometry Stream", filed Jan. 15, 1998 by Jeffrey M. Chan, issued on Feb. 22, 2000 as U.S. Pat. No. 6,028,607, is hereby incorporated by reference as though fully and completely set forth herein.

Figure 1A:
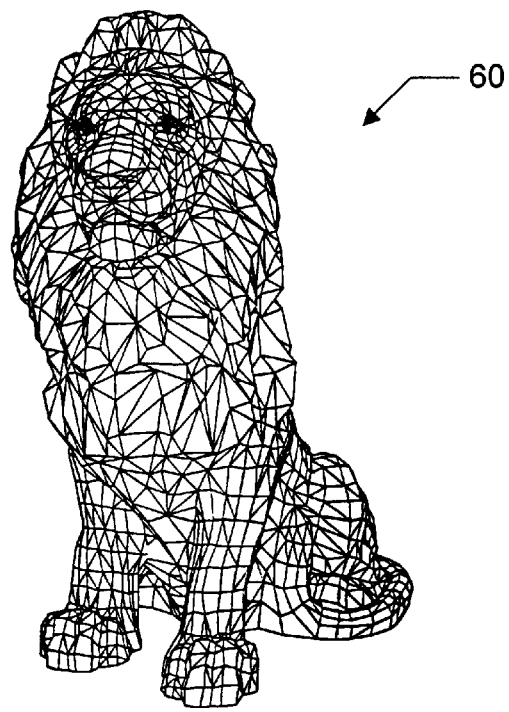
FIG. 1A illustrates a tessellated 3-D object with an irregularly tiled surface.
Figure 1B:
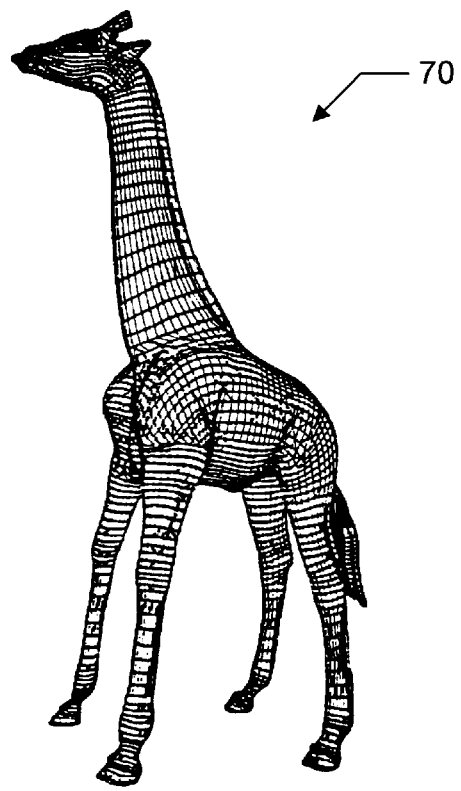
FIG. 1B illustrates a tessellated 3-D object with regularly tiled surface portions.
Figure 2:
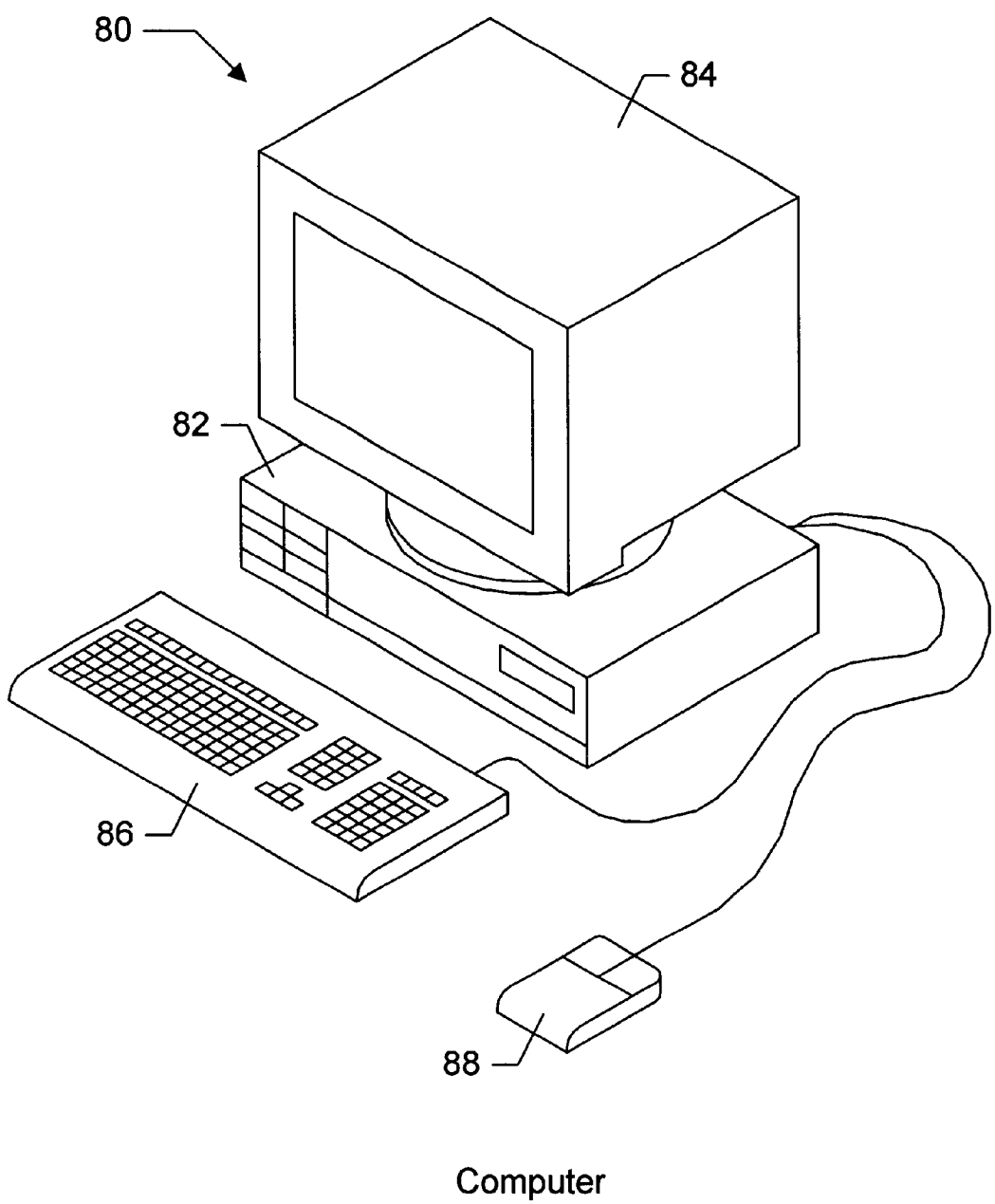
FIG. 2 illustrates a computer system which includes geometry compression capabilities according to the present invention.

FIG. 2—Computer System

Referring now to FIG. 2, a computer system 80 is depicted which includes three-dimensional geometry compression and/or decompression capabilities according to one embodiment of the present invention. As shown, the computer system 80 comprises a system unit 82 and a video monitor or display device 84 coupled to the system unit 82. Various input devices may be connected to the computer system, including a keyboard 86 and/or a mouse 88, or other input.

Application software may be executed by the computer system 80 which generates three-dimensional geometry data describing graphical objects to be rendered on display device 84. As will be described further below, computer system 80 is configured to compress the three-dimensional geometry data. The compressed 3-D geometry data may then be stored in the memory of computer 80. The compressed 3-D geometry data stored in the memory may then be later transferred over a network or transferred to a 3-D graphics accelerator within computer system 80 for decompression and rendering. Alternatively, the compressed 3-D geometry data is used to create a medium, such as a CD-ROM, which may be used for applications such as games. The compression advantageously results in decreased transmission time of the compressed geometry data over a network or to a graphics accelerator, as well as reduced memory requirements for storing the compressed geometry.

When the computer system 80 is configured for geometry decompression, the computer 80 receives compressed 3-D geometry data. This data may be received from a network, the host CPU of computer 80, or from a memory medium (such as a CD-ROM) coupled to the computer system.

Figure 3:
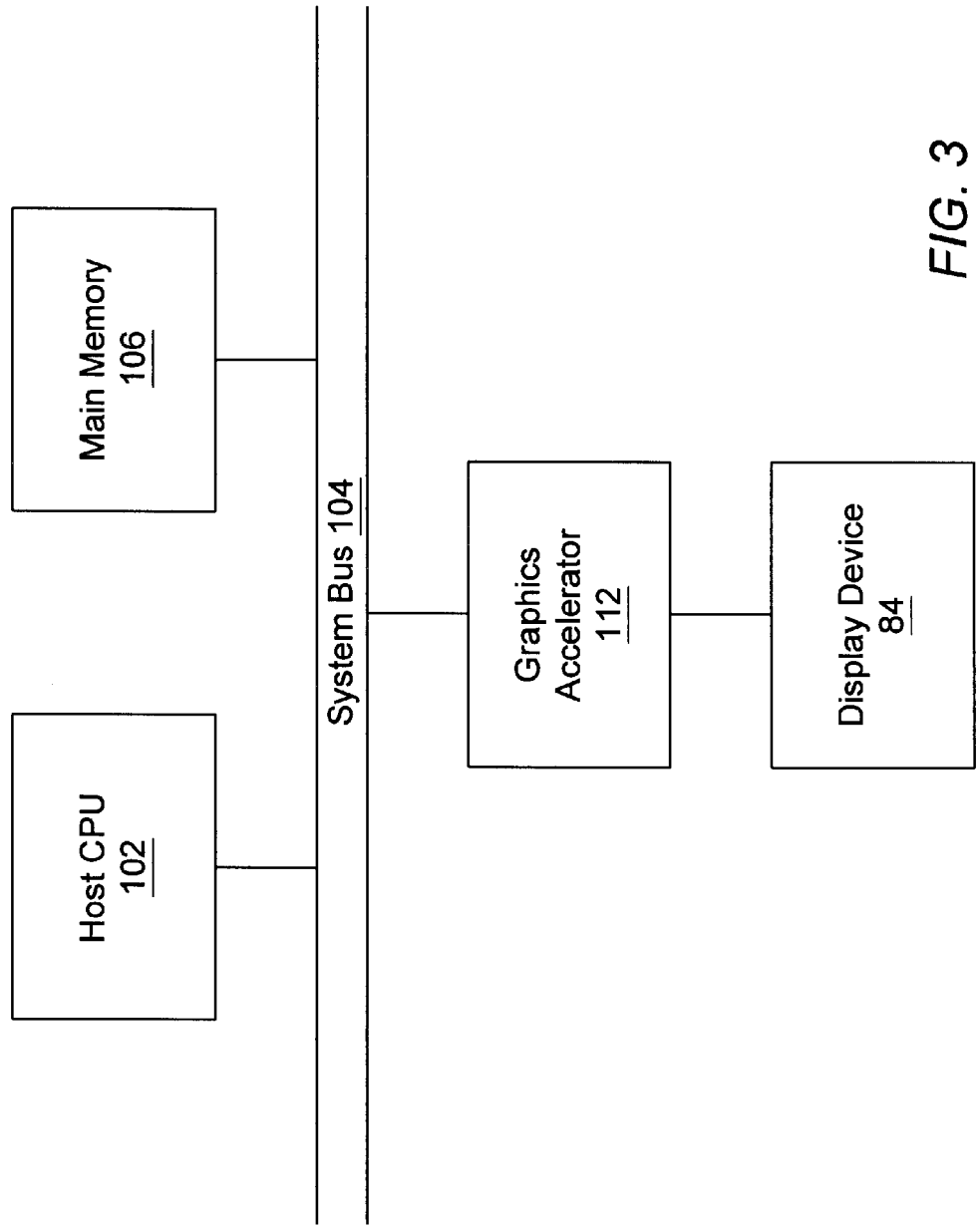
FIG. 3 is a simplified block diagram of the computer system of FIG. 2.

FIG. 3—Computer System Block Diagram

Referring now to FIG. 3, a simplified block diagram illustrating the computer system 80 of FIG. 2 is shown. Elements of the computer system 80 which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. Further, the graphics accelerator 112 may be coupled through one or more other buses to bus 104.

The host processor 102 may transfer information to and from the graphics accelerator 112 according to a programmed input/output (I/O) protocol over the host bus 104. In one embodiment, the graphics accelerator 112 accesses the memory subsystem 106 according to a direct memory access (DMA) protocol, or through intelligent bus mastering.

In one embodiment, three-dimensional geometry data is generated by a graphics application program executing on computer system 80. The resulting 3-D geometry data is compressed prior to or subsequent to storage in system memory 106. The geometry data may be compressed by host CPU 102 executing a software compression program from system memory 106, or transferred to a specialized hardware unit within system unit 82 for compression. If the computer system 80 is also being used to render the 3-D geometry data, the compressed data is transferred from system memory 106 to graphics accelerator 112 over system bus 104. Graphics accelerator 112 decompresses the transferred compressed geometry data, rendering the resulting primitives accordingly on display device 84. The compressed 3-D geometry data may also be transferred over a network for subsequent decompression (as discussed with reference to FIG. 4), or stored to a removable medium such as a CD-ROM. It is noted that 3-D graphics accelerator 112 may not be necessary if computer system 80 is used strictly for compression purposes. This may be the case if computer system 80 is used to store the compressed data to a memory medium or transfer the data over a network.

As described below, the compression system and method described herein is preferably directed toward compression of surface portions of three-dimensional objects which are regularly tiled. As also described below, the decompression system and method described below operate to decompressed compressed 3-D geometry data which has been compressed to take advantage of regular tiling of primitives included in the geometry data. In one embodiment, the compression system and method selectively performs different types or levels of compression on surface portions of 3-D geometry data, depending on whether the portion being compressed is regularly or irregularly tiled. Correspondingly, the decompression system and method selectively may perform different types of decompression depending on the particular surface portion being decompressed.

Figure 4:
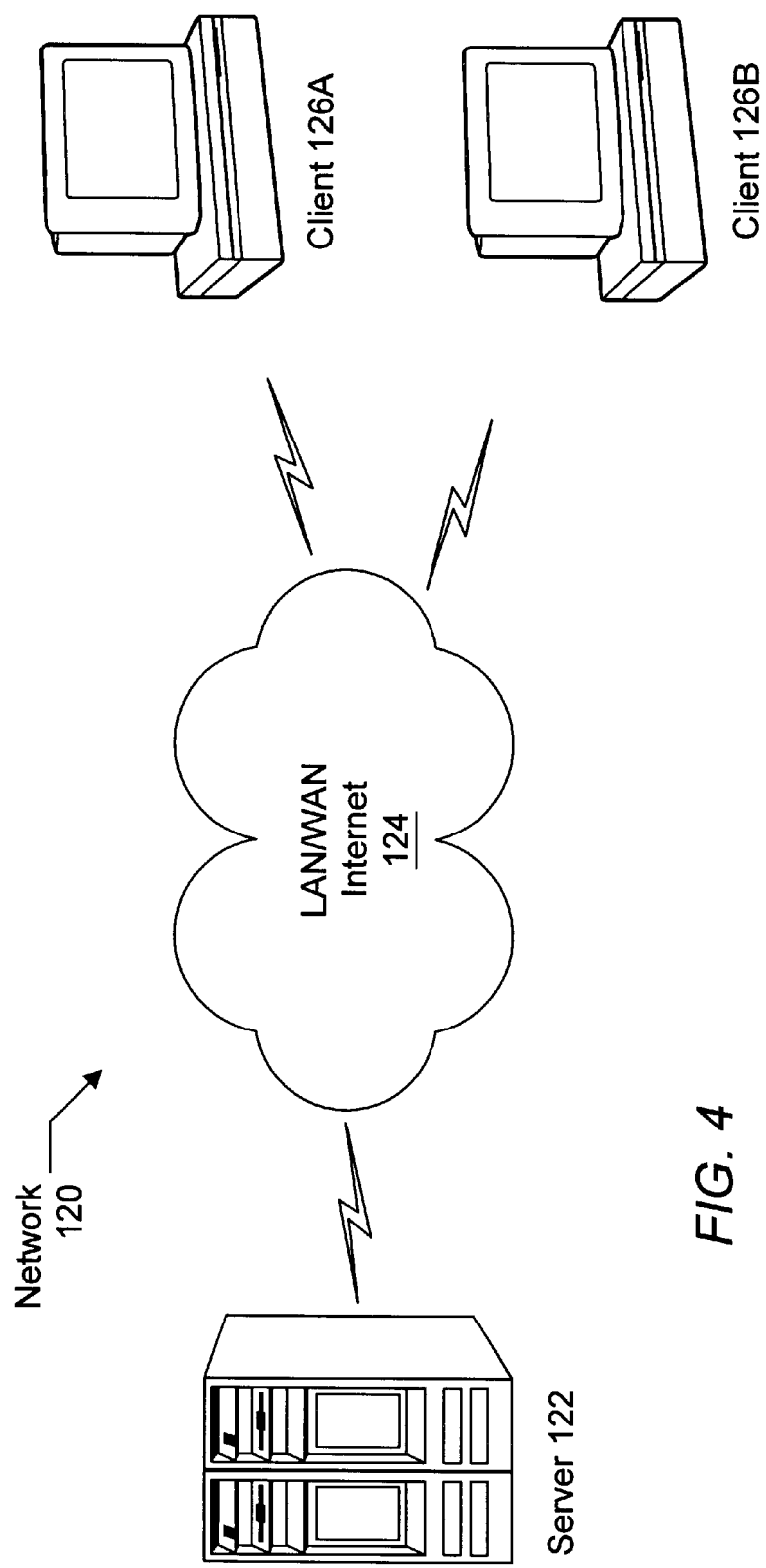
FIG. 4 illustrates a client-server network which transfers compressed geometry data according to the present invention.

FIG. 4—Computer Network

Referring now to FIG. 4, a computer network 120 is shown comprising at least one server computer 122 and one or more client computers 126. (In the embodiment shown in FIG. 4, client computers 126A–B are depicted). Server 122 and client(s) 126 may be joined through a variety of connections 124, such as a local-area network (LAN), a wide-area network (WAN), or an Internet connection. In one embodiment, server 122 stores pre-compressed 3-D geometry data in accordance with the present invention. Clients 126A–B may connect to server 122 to download the compressed geometry. One or more of clients 126 receive the compressed 3-D geometry data and then decompress the compressed geometry data for rendering. Alternately, one or more of clients 126 may generate 3-D geometry data, perform compression, and transfer the compressed geometry to server 122 for storage. In still another embodiment, the compressed 3-D geometry data may be transferred between client computers 126.

FIGS. 5–13—Geometry Compression of a Regularly Tiled Surface Portion

Figure 5:
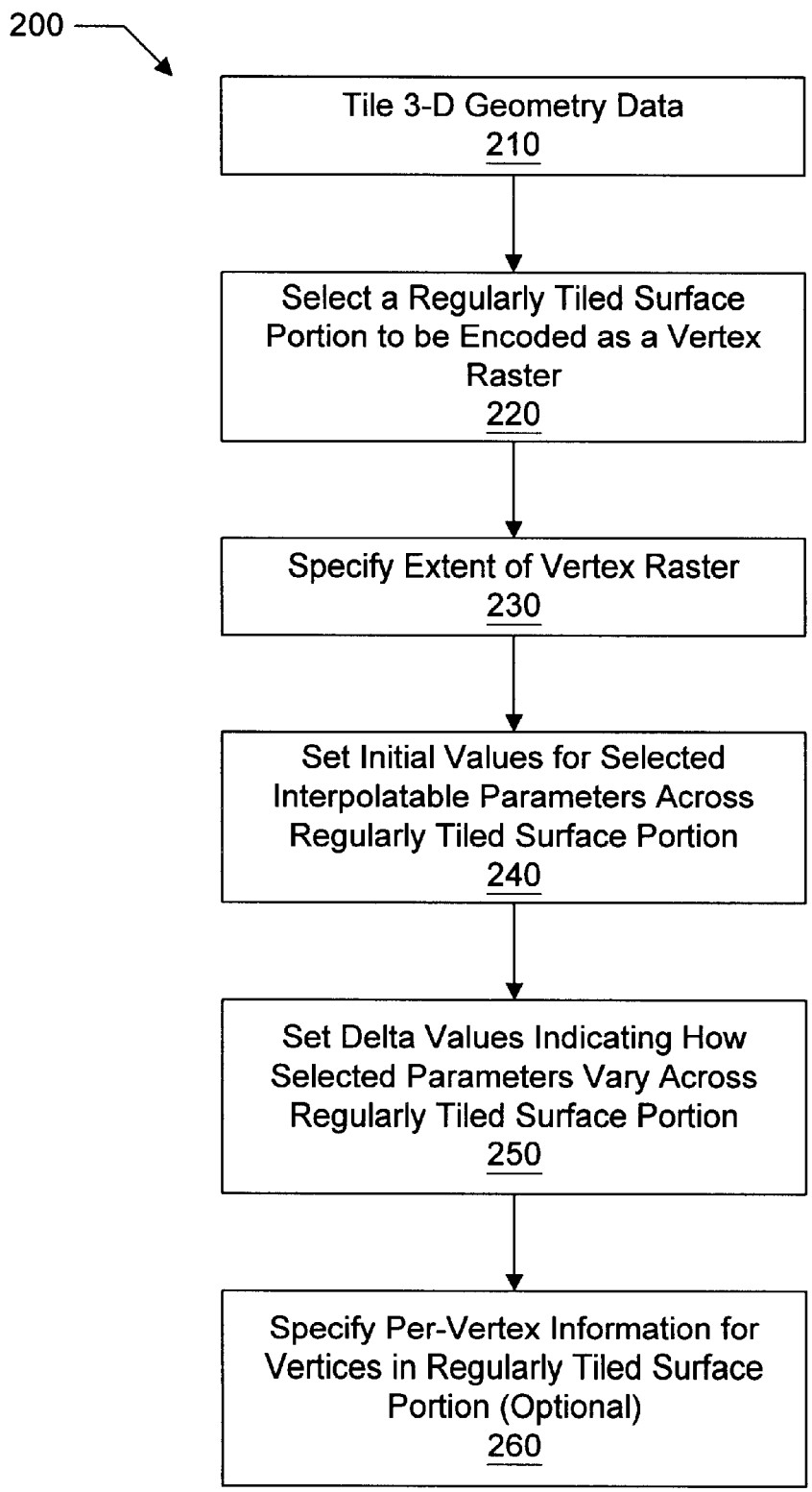
FIG. 5 depicts a method for compressing geometry data according to a preferred embodiment of the present invention.

FIG. 5 illustrates a compression method 200 for data defining a regularly tiled surface portion of a three-dimensional object. As shown, method 200 first includes step 210, in which the three-dimensional geometry data is tiled. In one embodiment, the geometry data may be represented as a generalized triangle strip. In another embodiment, the geometry data may be represented in generalized triangle mesh format. As described in U.S. patent application Ser. No. 08/511,294, a generalized triangle mesh format encodes position and connectivity of the geometry data, and utilizes space efficiently by allowing vertex information to be reused. One algorithm that may be utilized to generate a generalized triangle mesh representation is described in "Optimized Geometry Compression for Real-time Rendering" by Michael Chow in the proceedings of *IEEE Visualization* 97.

Figure 6:
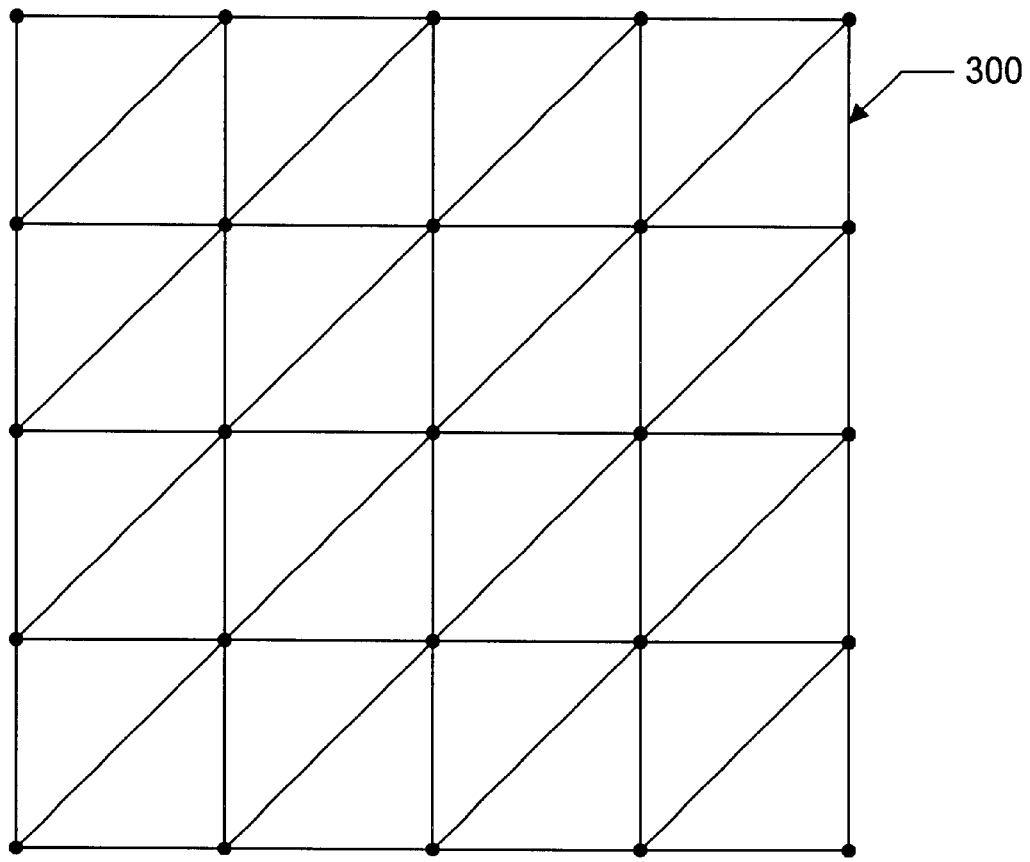
FIG. 6 illustrates a surface portion including a 5×5 grid of vertices which may be represented as a vertex raster according to the present invention.

In step 220, a regularly tiled surface portion is selected to be represented in compressed format. This compressed format is referred to herein as a "vertex raster". Generally speaking, a vertex raster includes an associated extent and sufficient information to determine one or more vertex parameter values within the specified extent. As will be described below, the extent portion of the vertex raster may specify one of a plurality of predefined sizes or may specify an arbitrary size and shape of the surface portion and the vertices included therein. FIG. 6 depicts a regularly tiled surface portion 300 which is to be represented as a vertex raster. Although a vertex raster may be of any given extent, the extent of the vertex raster shown in FIG. 6 is a 5×5 square grid of vertices.

In step 230, the extent of the vertex raster is specified in the encoded data stream. In a preferred embodiment, the extent value of a vertex raster is encoded as a 2-bit value which is indicative of a square grid which is one of three defined sizes: 5×5 (25 vertices), 9×9 (81 vertices), or 17×17 (289 vertices). It is noted that various other predefined sizes may be used instead of, or in addition to, the predefined sizes recited above. For example, a regularly tiled surface portion may be represented as a 3×5 vertex raster in one embodiment.

In one embodiment, specifying an extent for a vertex raster also implicitly defines connectivity information for vertices within the regularly tiled surface portion represented by the vertex raster. Consider surface portion 300 in FIG. 6. In one embodiment, an extent value for surface portion 300 specifies that the vertices are to be connected into squares (or, more generally, quadrilaterals or "quads"). Each quad is typically split (or "tessellated") into a pair of triangles which are then encoded in a compressed geometry data stream. It is noted that a given quad may be tessellated in one of two directions: from the lower left corner to the upper right corner or from the upper left corner to the lower right corner. In one embodiment, if no explicit tessellation information is specified on a quad-by-quad basis, all quads are assumed to be split in a default direction (such as the default direction shown for all quads in FIG. 6). As will be described below, explicit connectivity information may also be supplied within a vertex raster.

Furthermore, the vertices of a surface portion do not necessarily have to be grouped as quadrilaterals in order to be represented as a vertex raster. For example, consider a surface portion which is tiled in a hexagonal manner. A vertex raster may be defined for such a surface portion which specifies vertices which are to be assembled into hexagons rather than quads or triangles. Also, a vertex raster may also be defined for an irregularly tiled surface portion which is irregular in a predictable fashion.

In one embodiment, it is noted that adjacent surface portions of a graphical object may each be represented as a vertex raster. In such an embodiment, each surface portion may share vertices along the common edge(s). Accordingly, the vertices in the vertex rasters representing the adjacent surface portions may also each include information on the common vertices.

As will be described below, the extent of the vertex raster is used during decompression to determine parameter values for each of the vertices within the surface portion represented by the vertex raster. The format of the "SetVertexRasterSize" command in a preferred embodiment of the present invention is shown in FIG. 7. Two bits are used in the command to specify one of the three predefined raster sizes. In an alternate embodiment, the vertex raster may be of an arbitrary size. This arbitrary size may be given explicitly, or may be encoded in the per-vertex data stream as "stop codes" which indicate the end of a row or data or of the entire raster.

In addition to specifying an extent of a surface portion, a vertex raster also includes sufficient information to decompress vertex parameter values of vertices within the surface portion represented by the vertex raster. As will be described below, the vertex parameter values of the regularly tiled surface portion may be specified per-vertex (explicitly), by interpolation values, or using a combination thereof. In one embodiment, the vertex parameter values specified within a vertex raster include (i) position values, (ii) color values, (iii) normal values, (iv) texture map coordinates, (v) bump/displacement mapping values, and (vi) surface material properties.

In one embodiment, initial values of selected parameters may be specified within a vertex raster along with an indication of how these values change across the vertex raster. For example, consider a surface portion of a graphical object in which positional coordinates vary in a regular fashion. For such a surface portion, initial position values may be specified which correspond to a predetermined vertex within the surface portion. Then, positional delta values may be specified which indicate how position values change from vertex-to-vertex within the surface portion represented by the vertex raster. Interpolation may also be performed upon other vertex parameter values, such as those listed above. Values encoded in this manner are also referred to as being globally specified values.

Vertex parameter values may also be specified explicitly, on a per-vertex basis. In one such embodiment, a vertex raster may include an extent, an encoding specifying what parameters are included in the vertex raster, followed by a stream of per-vertex data. The size of this vertex data is determinable from the extent of the surface portion and the size of the data specified for each vertex. While this technique may not achieve the compression possible using the interpolation values described above, compression still results from not having to explicitly encode connectivity information for the regularly tiled surface portion. Values encoded in this manner are also referred to as being locally specified values.

These two techniques (interpolation and per-vertex data) may also be combined within a single vertex raster. That is, certain vertex parameter values may be specified by a interpolation, while others may be specified on a per-vertex basis. For example, a vertex raster representing a given surface portion of a graphical object may include position values which are specified by interpolation and color values which are specified on a per-vertex basis. In yet another embodiment, a given vertex parameter value may be computed using global and local values. One example of this technique is the use of locally specified z-displacement values to perturb globally specified normal values.

In the flowchart of method 200 shown in FIG. 5, both techniques for specifying vertex data are utilized. Interpolated values are encoded in steps 240–250, while per-vertex data is encoded in step 260. These steps are described in further detail below.

In step 240, initial values of selected parameters are specified for vertices in the surface portion represented by the vertex raster. These selected parameters correspond to an initial vertex, which is typically in a predefined location within the surface portion. The values of the remaining vertices are interpolated across the raster during the decompression process based on the initial values set in step 240. Since these parameters are interpolated for each vertex in the surface portion, these parameters do not have to be specified on a per-vertex basis in the compressed data stream, thereby saving memory and bus bandwidth. The initial parameter values are specified, in one embodiment, using a "SetVertexRasterStart" command in a preferred embodiment of the invention. One possible format for this command is shown in FIG. 8.

As shown in FIG. 8, the "SetVertexRasterStart" command specifies one of five vector registers (i=0 to 4). Each of these vector registers includes a different interpolatable parameter. The assignment of these vector registers in a preferred embodiment is shown below in Table 1.

TABLE

| Vector Register | Parameter |
| --- | --- |
| 0 | Position |
| 1 | Global Color |
| 2 | Global Normal |
| 3 | Bump/Displacement Mapping Basis Vector 0 |
| 4 | Bump/Displacement Mapping Basis Vector 1 |

Vector register 0 (VR0) includes initial position data, and is configured in a preferred embodiment to store 16-bit fixed point values for x, y, and z coordinates. VR1 is configured to store 4 16-bit color values in a preferred embodiment: red, blue, green, and alpha. The alpha value is optional depending on the state of a mode bit discussed below. VR2 stores the x-y-z components of a global normal value, while VR3–4 store basis vectors used to assist in bump and displacement mapping. In a different embodiment, the vector registers may be configured differently. For example, a different number or a different size per register may be used. Similarly, other attributes relating to the vertices may be stored in the vector registers in place of or in addition to the parameters shown above. In one embodiment, a vertex raster representation may include zero to five SetVertexRasterStart commands, one for each vector register. In this embodiment, if no vector registers are specified, vertex parameter values are specified on a per-vertex basis.

Figure 9:
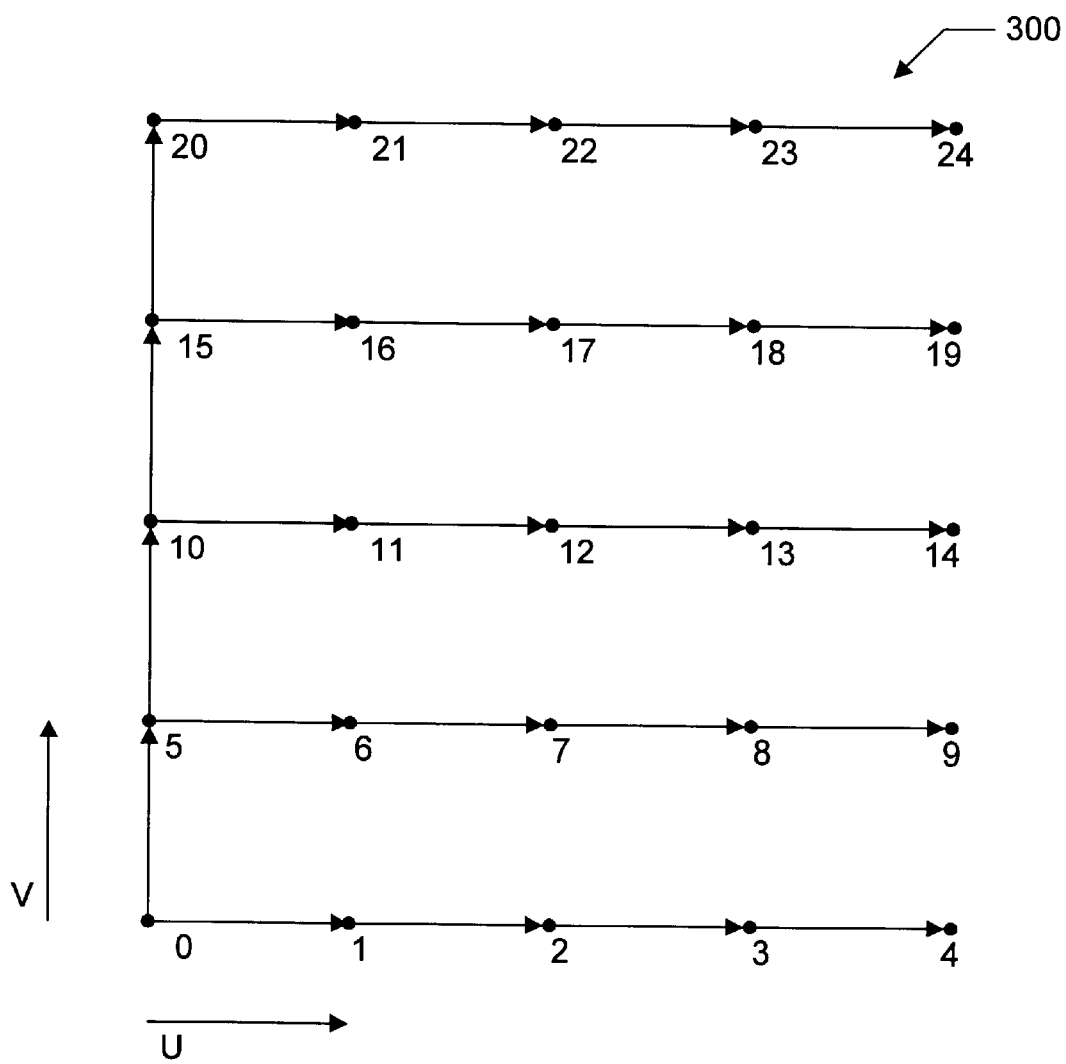
FIG. 9 illustrates a traversal order of the vertices of a surface portion according to a preferred embodiment of the present invention.

In step 250, delta values are set for the parameters selected in step 240, indicating how these parameters vary across the surface portion represented by the vertex raster. In a preferred embodiment, these delta values may be specified in both the U and V directions (not to be confused with the names sometimes used for texture mapping coordinates). The U and V directions are shown for one embodiment of a regularly tiled surface portion in FIG. 9. FIG. 9 also depicts the vertices within surface portion 300 labeled according to the order in which the vertices are processed during decompression (and hence the order in which interpolation is performed). Similarly, the order shown in FIG. 9 also refers to the order in which per-vertex data is stored within the vertex raster representation of surface portion 300. As shown in FIG. 9, the U direction, in one embodiment, refers to the direction between vertices on a particular row. Conversely, the V direction, in one embodiment, refers to the direction between successive rows.

Figure 10A:
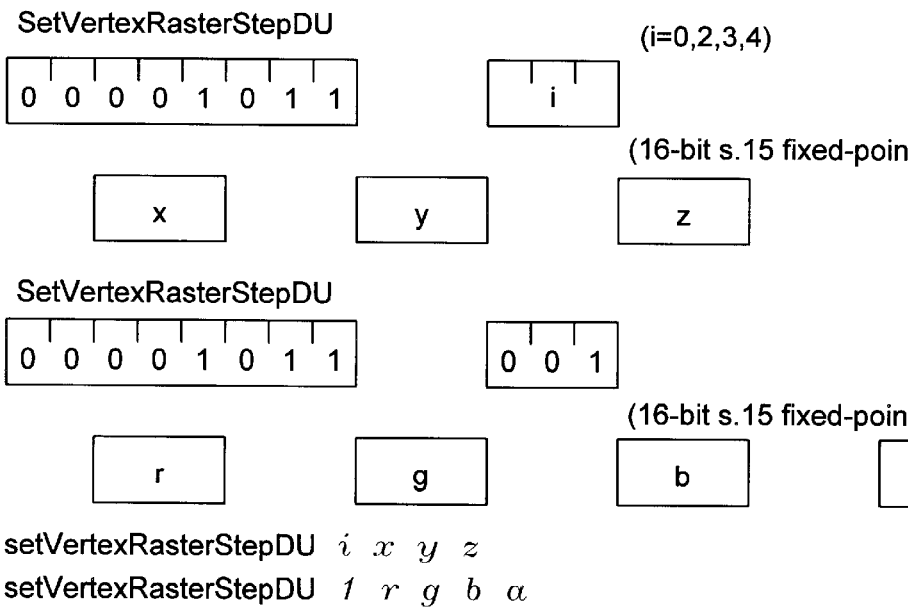
FIGS. 10A–B depict the format of commands to vary parameters to be interpolated across the surface portion according to a preferred embodiment of the present invention.
Figure 10B:
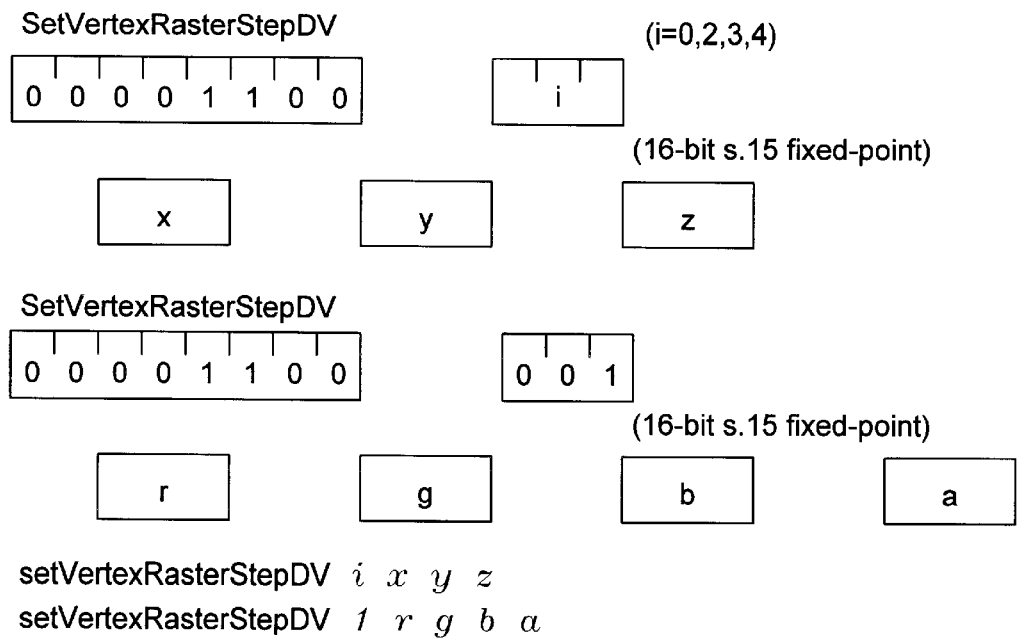
Figure 11A:
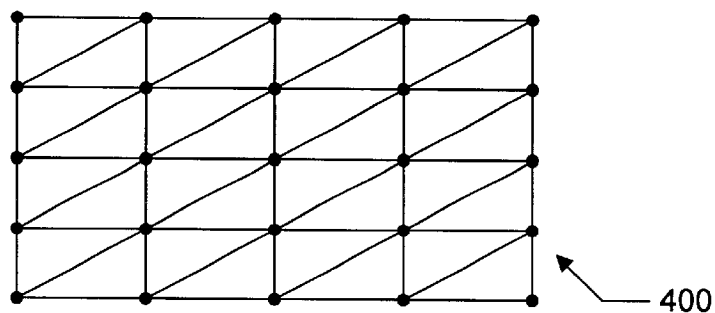
FIGS. 11A–C illustrate surface portions with various delta U and delta V position values.
Figure 11B:
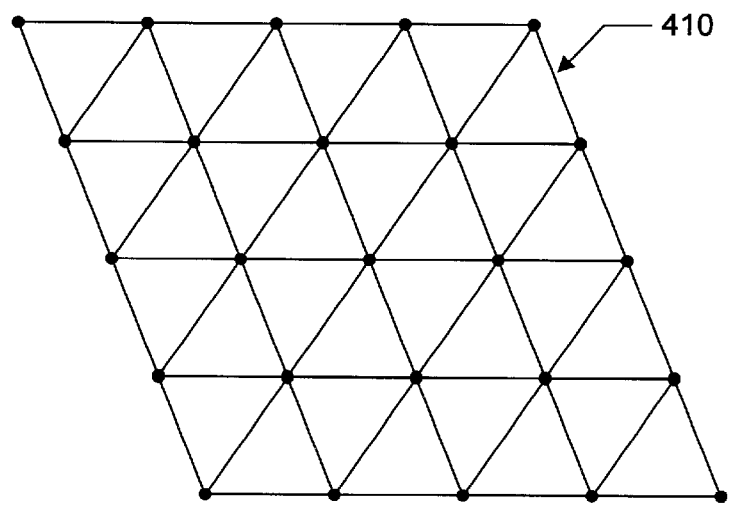
Figure 11C:
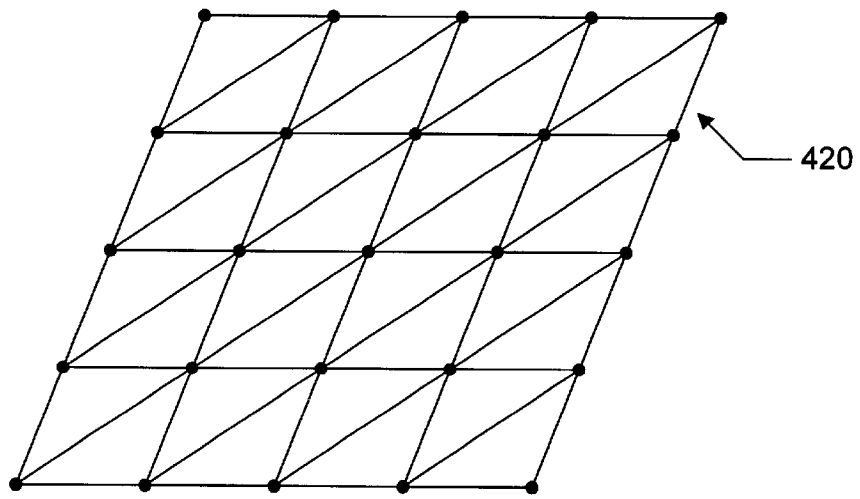

Referring now to FIGS. 10A and 10B, the formats for commands which, in one embodiment, set the delta values for the parameters selected in step 240 are shown. FIG. 10A depicts the format of the "SetVertexRasterStepDU" command, while the "SetVertexRasterStepDV" command format is depicted in FIG. 10B. The Vertex Raster Delta-U vector registers are configured to store three (four, in the case of VRDU1) fixed point values which indicate the change between each vertex in the raster in the U direction for a particular quantity. For example, the x-y-z values in VRDU0 indicate the position difference (Δx, Δy, and Δz) between any two adjacent vertices in FIG. 9 within the same row. The Vertex Raster Delta-V registers are configured similarly (VRDV0 values specify the position difference between any two adjacent vertices in FIG. 9 within the same column). In one embodiment, these delta registers allow position, global color, global normal, and bump/displacement vectors to be specified once (by the "SetVertexRasterStart" command), with the remaining values for the vertices of the raster interpolated during decompression, thereby reducing the size of the encoded data stream. The values specified by the "SetVertexRasterStep" commands are effectively the derivative of the value represented by VRi (i=0–4) with respect to the U or V planar coordinate.

Note that all of the vector registers are optional with respect to the vertex raster; that is, none, some, or all of them may be set. Even with no values interpolated in the vertex raster, the connectivity information is still inherent in the vertex raster representation. This eliminates the need for mesh buffer push and reference bits which are used explicitly in generalized triangle mesh format. The use of the vector registers VR0–4 4 is advantageous where applicable, however, since greater compression ratios may be achieved.

Although the vertices of surface portion 300 are arranged in a square grid, the formats of the vertex raster step commands described above allow specification of surface portions that have vertices arranged in alternate fashions. This is facilitated by having separate step commands for the U and V direction, which both allow changes in each of the x, y, and z coordinates. By appropriate encodings of the SetVertexRasterStepDU and SetVertexRasterStepDV commands, surface portions such as 400, 410, and 420, depicted in FIGS. 11A–C, may be compressed according to the present invention. Surface portion 400 includes vertices organized as a rectangular grid, while surface portions 410 and 420 are organized as rhombuses (with no right angles) and parallelograms (with unequal adjacent sides and unequal interior angles), respectively.

In step 260, optional per-vertex is specified for vertices in the surface portion represented by the vertex raster. In one embodiment, this information is specified using one of the commands shown in FIGS. 12A–C. FIG. 12A depicts the format of an "ExecuteVertexRaster" command according to one embodiment of the invention. This command is followed by a stream of per-vertex data. In one embodiment, the format of the per-vertex data is pre-specified using an additional command described below. In this manner, the end of the stream of per-vertex data may be determined by multiplying the number of vertices by the data size for a given vertex. This allows another geometry command to immediately follow the per-vertex data without necessitating stop bits for the execute command. There area also other techniques which obviate the need for stop bits in the per-vertex data stream. One such technique that uses header-body pairs is described in greater detail below. Because the per-vertex data follows in-line with the command, no other opcodes are needed until all data points corresponding to each of the vertices in the raster have been read. In a preferred embodiment, the execute command includes per-vertex data for 25, 81, or 289 vertices.

Alternately, the vertex raster data may be specified starting at a memory address by the "ExecuteVertexRasterIndirect" command shown in FIG. 12B. This allows the same per-vertex data to be used for different rasters while changing the interpolation parameters as described above. Compression efficiency is advantageously increased by use of this command.

The "ExecuteVertexRaster32Indirect" command shown in FIG. 12C is used for vertex rasters with a special memory format: 32-bit rgba pixels. The vertex raster data starts at the address specified, but after 5, 9, or 17 pixels (depending on the size value), the raster data continues at address+stride, where stride is the width of the raster in bytes. Both the address and stride are 32-bit word-aligned in a preferred embodiment of the invention.

As described above, various vertex parameter values may be specified on a per-vertex basis. In a preferred embodiment, the per-vertex attributes which are specified as part of a given vertex raster is determined by the state of mode bits set by the most recent "SetState" and "SetState2" commands. The format of these commands in one embodiment is shown in FIGS. 13A and 13B. A description of the operand fields of the SetState command is given in Table 2.

TABLE 2

| Bit Field | Description |
| --- | --- |
| dde | Delta-delta encoding enabled for some vertices of vertex raster |
| bnv | bundle normals with per-vertex data |
| bcv | bundle colors with per-vertex data |
| cap | color values include alpha component |
| qsp | quad split tessellation bits included with per-vertex data |

The "dde" bit enables delta-delta encoding and is discussed further below. The "bnv" and "bcv" bits, when set, specify that normals and colors, respectively, are part of the per-vertex data which follows the "ExecuteVertexRaster" command. If the "cap" bit is set, the per-vertex color values include an alpha value in addition to rgb components. Finally, if the "qsp" bit is set, a tessellation bit is specified for each quadrilateral in the vertex raster. These separate tessellation bits are used for anti-aliasing purposes and are discussed further below.

A description of bit fields in the SetState2 command is given in Table 3 below.

TABLE 3

| Bit Field | Description |
| --- | --- |
| scp | Specular color present in per-vertex data |
| tex | Interpret specular color as texture map coordinate |
| tx2 | Interpret specular color as second texture map coordinate |
| psrc | Position source:<br>00-xyz positions in per-vertex data; VR0 not used<br>01-xyz positions not in per-vertex data; VR0 used<br>10-xyz positions not in per-vertex data; VR0 used; z-displacement in per-vertex data<br>11-reserved |
| vr1 | Enable output of VR1 values |
| vr2 | Enable output of VR2 values |
| vr3 | Enable output of VR3 values |
| vr4 | Enable output of VR4 values |

The SetState2 command is an extension of the mode bits set by the SetState command described above. The "scp" bit indicates that specular color values are present in the per-vertex information. This specular color values is interpreted as a texture map coordinate if the "tex" bit is set. Likewise, the local color value (controlled by the "bcv" bit) is interpreted as a coordinate from an alternate texture map if the "tx2" bit is set.

The "psrc" bits determine how the vertex positions are computed between successive vertices in the surface portion being represented as a vertex raster. If psrc=00, the xyz positions are explicitly specified for each vertex in the surface portion (even if VR0 has been initialized). Although this does not take full advantage of the vertex raster symmetry, the connectivity information is still implicitly defined by the raster. Hence, there is no need for the explicit mesh buffer pushes and references that are used in a generalized triangle mesh with no vertex raster command.

If psrc=01, the initial value for the xyz position data is interpolated across the vertices of the vertex raster according to the predefined U and V delta values. Referring again to FIG. 9, the initial position values (as specified by the SetVertexRasterStart command) are applied to vertex 0. The delta U value is then applied to vertex 0 to obtain the position data for vertex 1. The same procedure is followed for vertices 2, 3, and 4. To determine the position of vertex 5, the delta V value is applied to vertex 0. The delta U is then applied to vertex 5 to calculate vertex 6 (and subsequently, vertices 7, 8, and 9). In this mode, greater compression efficiency may be achieved relative to psrc setting '00', in which position data is explicitly specified for every vertex.

When psrc=10, xyz positions are interpolated from VR0 as described above. Additionally, z displacement values are present in the per-vertex data. The z displacement values are used to perform displacement texturing, in which the surface is offset by a small amount in order to simulate a wrinkle or a bump. In many cases, this is more effective than bump mapping (in which the surface normal is perturbed), particularly near the silhouette of a shaded object. The psrc=11 encoding is not currently used in a preferred embodiment of the invention.

Bit fields vr1, vr2, vr3, and vr4 in the SetState2 command are used by the decompression unit to determine if the various vector register quantities are enabled for a particular raster. If a bit is not sent for a particular quantity, the decompression unit does not forward on a value for that quantity (e.g., a local normal) to a subsequent stage of the rendering hardware. In one embodiment, the vr state bits correspond to those attributes which are initialized by the SetVertexRasterStart command.

In alternate embodiments, additional state bits are employed which specify additional data to be included in the per-vertex data of the raster. It is further noted that the per-vertex data of the raster may be encoded in a variety of manners, including the compression techniques disclosed in the parent patent application for positions, colors, and normals.

Figure 15:
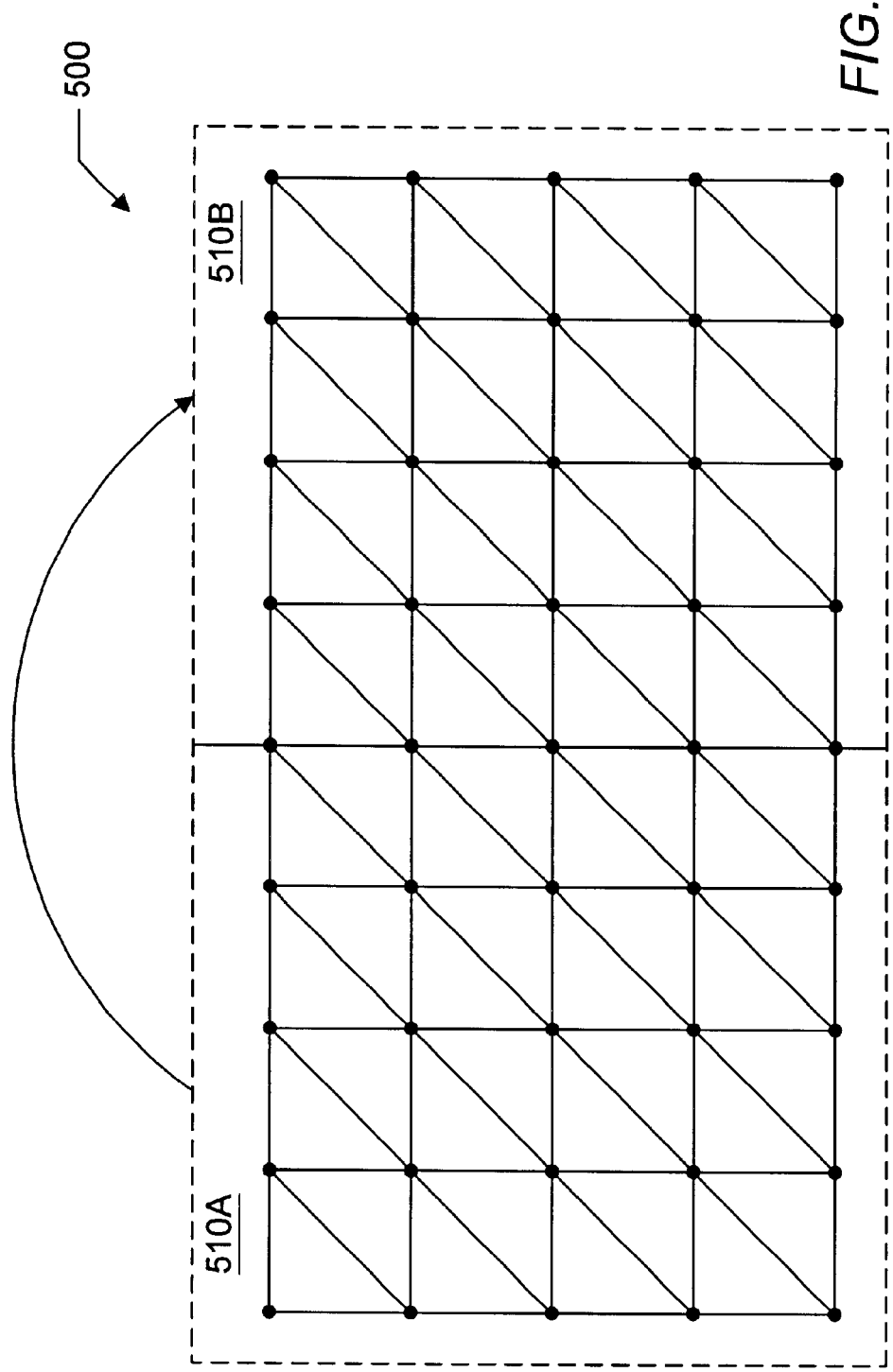
FIG. 15 illustrates a regularly tiled surface portion which may be compressed using the step vertex raster command according to a preferred embodiment of the present invention.
Figure 16:
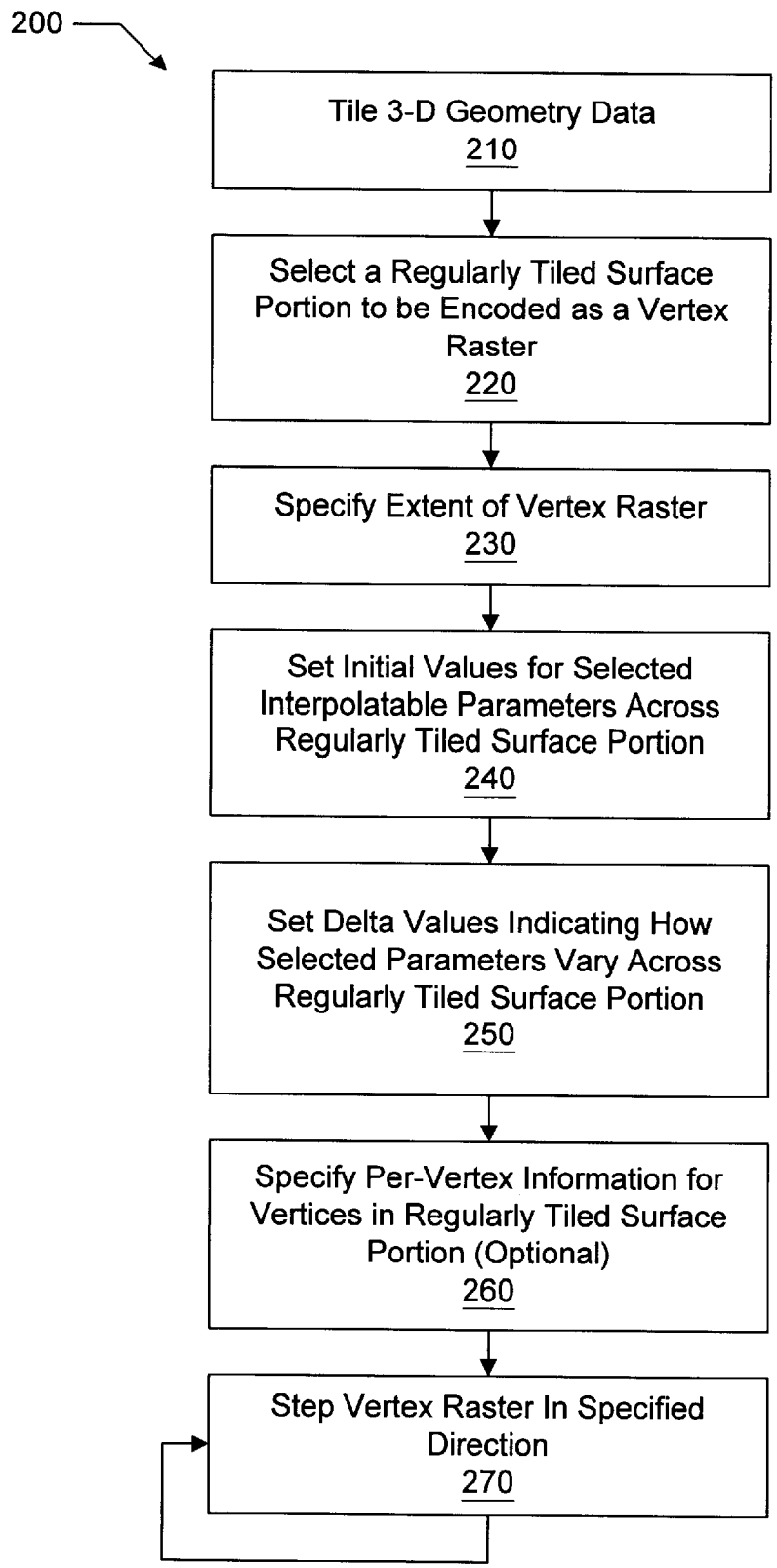
FIG. 16 depicts a method for compressing geometry data using the step vertex raster command according to a preferred embodiment of the present invention.

FIGS. 14–16—StepVertexRaster Command

As described above, for a preferred embodiment of the present invention, vertex rasters may be defined to represent regularly tiled surface portions having vertices arranged in square grids that are one of three predetermined sizes: 5×5, 9×9, and 17×17. The grids are limited to these sizes in a preferred embodiment in order to simplify the decompression hardware. As a result, however, an entire regularly tiled surface portion may not be able to be represented by a single vertex raster structure in some instances. In these cases compression efficiency would be compromised if all the vertex raster data had to be re-specified.

In order to circumvent this limitation while still maintaining a manageable vertex raster size, a "StepVertexRaster" command may be used. The format for this command according to one embodiment of the present invention is shown in FIG. 14. The stepVertexRaster command takes a single argument, "dir". This three bit field encodes one of three possible directions in which to move the current vertex raster. The encoding of the dir field in a preferred embodiment is shown in Table 4 below:

| Bit Field | Direction |
| --- | --- |
| 000 | +U |
| 001 | +U, +V |
| 010 | +V |

It is noted that in an alternate embodiment, the encoding of the dir field may be expanded to represent additional directions to move the current raster (e.g., –V; –U, +V; etc.).

An example of a use for the StepVertexRaster command is illustrated in FIG. 15. FIG. 15 depicts a 9×5 regularly tiled surface portion 500 of a three-dimensional object. In a preferred embodiment as described above, this size surface portion is not able to be represented as a single vertex raster. In one embodiment, surface portion 500 may be divided into two 5×5 surface portions 510A–B and efficiently compressed using a combination of the method described with reference to FIG. 5 and the StepVertexRaster command of FIG. 14. A method 600 for compressing surface portion 500 is shown in FIG. 16.

As shown, method 600 proceeds according to method 200 described above. Surface portion 500 is tiled and selected to be encoded a vertex raster in steps 210 and 220. In step 230, the extent of the first vertex raster (510A) is set as a 5×5 square grid. Next, initial values are set up in the VR registers for the vertex 0 of raster 510A in step 240. In step 250, delta U and delta V values are stored specifying how the parameters initialized in step 240 vary across the raster. In step 260, an execute vertex raster command is issued, followed by optional per-vertex data for the raster.

After vertex raster 510A is specified by steps 210–260, a StepVertexRaster command is issued in step 270. In the example shown in FIG. 15, vertex raster 510B is the next to be encoded. With respect to vertex raster 510A, raster 510B is located in the +U direction. The StepVertexRaster command in step 270 therefore includes a dir bit field value of '000' in a preferred embodiment.

In one embodiment, execution of the StepVertexRaster command causes the values of the active vector registers to be interpolated in the direction specified by the 'dir' value. In the example above, the delta U values are multiplied by 4 and added to the initial active VR values to obtain the initial values for raster 510B. No change is calculated in the V direction. Furthermore, the stepVertexRaster command causes the per-vertex data specified by the previous vertex raster command to be re-executed with respect to the new values in the VR registers.

As shown in FIG. 16, step 270 may be repeatedly executed. Upon execution of each step command, new values are calculated for the VR registers. These new values are then used as a basis for interpolation across vertices of the newly-specified surface portion. Upon issuance of yet another step command, the most recently calculated VR register starting values are used as a basis for calculating new VR register starting values.

Because interpolation values do not have to be redundantly specified for raster 510B, the compression efficiency is advantageously increased for surface portion 500. In a different embodiment, the command(s) to step the vertex raster may be supplied by additional data in the per-vertex information or as additional operands to the execute raster command. The specification of a step function for vertex rasters effectively allows compression of the compressed geometry data, advantageously reducing the amount of data encoding.

Figure 17A:
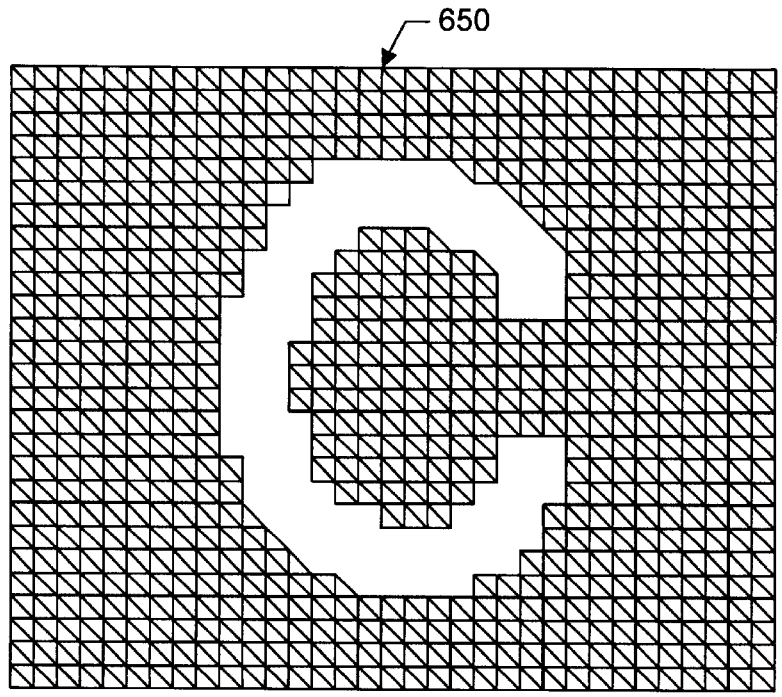
FIG. 17A depicts aliasing effects caused by splitting surface portion quadrilaterals in only one direction.
Figure 17B:
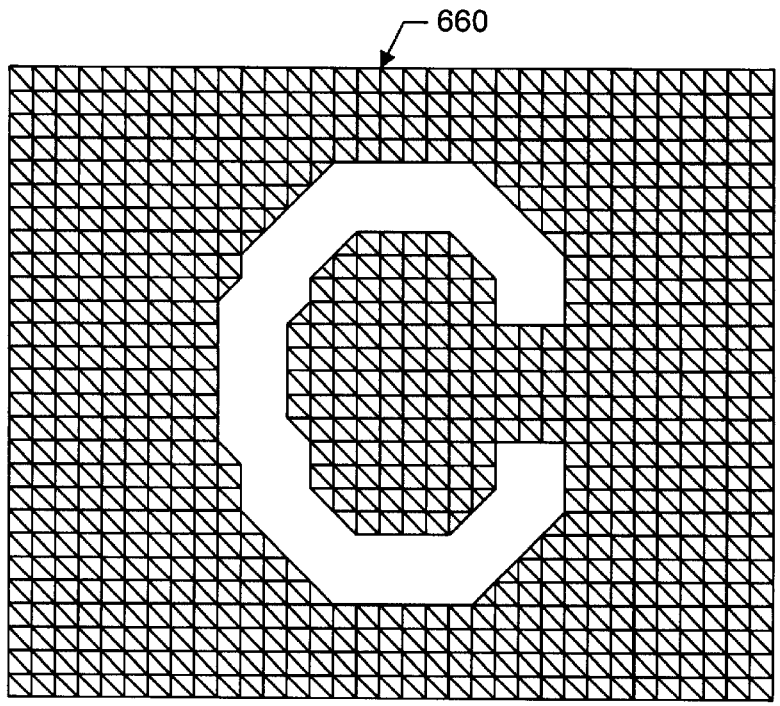
FIG. 17B depicts reduced aliasing effects exhibited by a preferred embodiment of the present invention which allows designation of split direction on a per-quadrilateral basis.
Figures 18, 19:
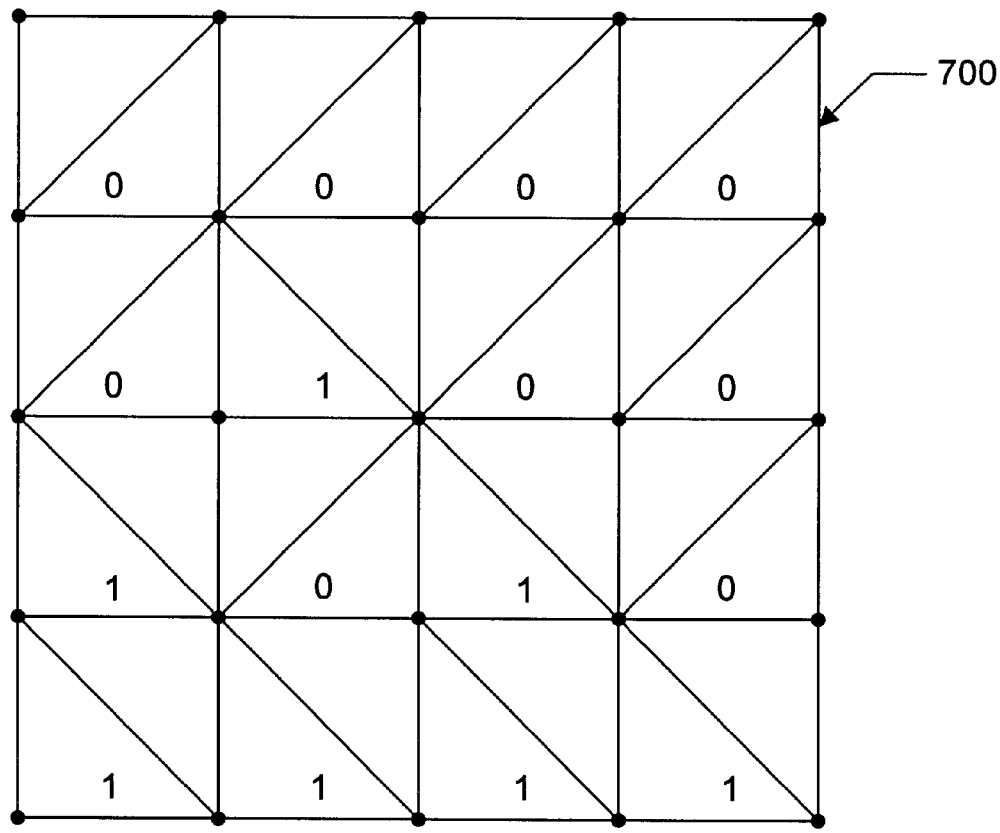
FIG. 18 illustrates a surface portion tessellated with quad split bits according to a preferred embodiment of the present invention.
FIG. 19 depicts the format of a set edge half resolution command according to a preferred embodiment of the invention.

FIGS. 17–18—Quad Split Tessellation

In the surface portions depicted above, the quadrilaterals formed by the intersection of row and column lines are shown as all being tessellated in the same (default) direction. Regardless of which direction is chosen as a default, undesirable visual artifacts may result. Consider the representation of the letter "C" 650 shown in FIG. 17A. For letter 650, each quad in the surface portion is tessellated in the same direction (upper left to lower right corner). This results in portions of letter 650 having jagged edges.

In contrast, the representation of the letter "C" 660 is formed using selective splitting of quadrilaterals. That is, each quadrilateral in the surface portion of FIG. 17B is split in a manner most befitting the object being drawn. Accordingly, letter 660 has a reduced degree of "jagginess" with respect to letter 650.

Objects may thus exhibit serrated edges if the split direction does not match the strongest color change within a given quadrilateral. Quad tessellation direction may be specified using values in the encoded data stream, or, alternatively, through the use of a quad split difference function calculated dynamically during decompression. The use of either method advantageously results in fewer artifacts in the final rendered image.

The qsp field of the SetState command is set in order to enable explicit specification of quad tessellation in the vertex raster. That is, when the qsp field is set, the per-vertex data stream following the ExecuteVertexRaster command includes a bit value for each quadrilateral, indicating the split direction. An example of tessellation performed on a per-quadrilateral basis is shown in FIG. 18.

Referring now to FIG. 18, surface portion 700 includes a 5×5 grid of vertices divided into 16 quadrilaterals. Each of the quadrilaterals is labeled by its corresponding split bit. Quadrilaterals labeled with a '0' (the default direction) are split from the lower left corner to the upper right, while quadrilaterals labeled with a '1' are split from the upper left to lower right corners.

In a preferred embodiment, when the qsp bit is not set by the SetState command, a difference function may be used to automatically determine the quad split direction during rendering. In one embodiment, this difference function is given by the following equation:

$$diff(A, B) = \left| \frac{(r_A - r_B)}{2} + (g_A - g_B) + \frac{(b_A - b_B)}{4} \right|.$$

This equation may be applied to opposing vertices within a given quadrilateral in order to determine which pair has the "strongest" color change. Using this technique requires no additional data to be transferred during encoding since the split bit is calculated as a function of the color values (which are sent anyway). Compression efficiency is advantageously increased. It is noted, however, that while this technique is appropriate for color determination, it may be incorrect for lighting computations. That is, the split direction may produce a "smoother" color flow, but may produce a less realistic lighting effect. For this reason, in an alternate embodiment, the correct split direction may be determined after lighting.

As an example of the use of the difference function, consider a 5×5 mesh with vertices 0 to 24. A particular quadrilateral is denoted by vertex n, where n is the upper right vertex in the quadrilateral (hence n may take the values 6–9, 11–14, 16–19, and 21–24). The difference equation may thus be applied to pairs (n−6, n) and (n−5, n−1). If the (n−5, n−1) pair has the greater difference function, the quadrilateral is split in the default tessellation direction (lower left vertex to upper right). Alternatively, the quadrilateral is split from the upper left to lower right vertex if the (n−6, n) pair has the greater difference function. It is noted that the above equation is an approximation of red-green-blue to black and white color space conversion.

It is noted that in a different embodiment, an alternative difference function may be used. Similarly, encodings of split direction may also differ in other embodiments. It is further noted that the automatic split determination may be enabled/disabled through the use of a mode bit in one embodiment.

Figure 20A:
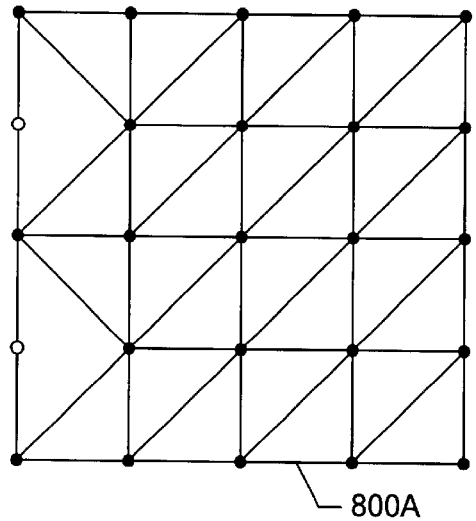
FIGS. 20A–D depict surface portions with each of the half-rez edge bits set according to a preferred embodiment of the present invention.
Figure 20B:
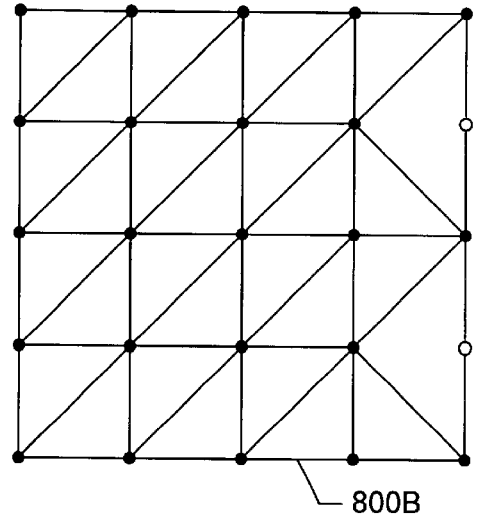
Figure 20C:
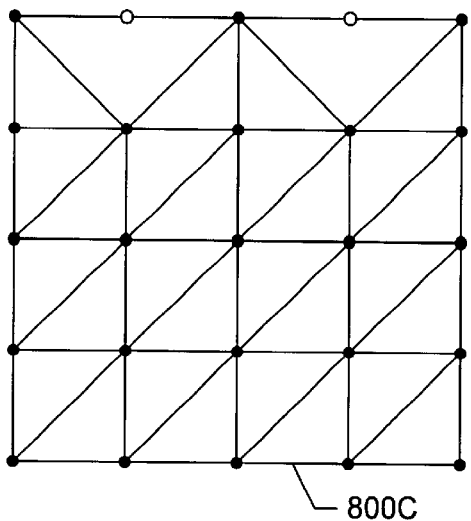
Figure 20D:
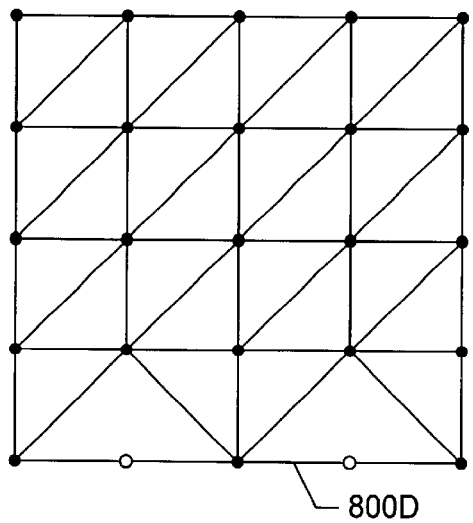
Figure 21:
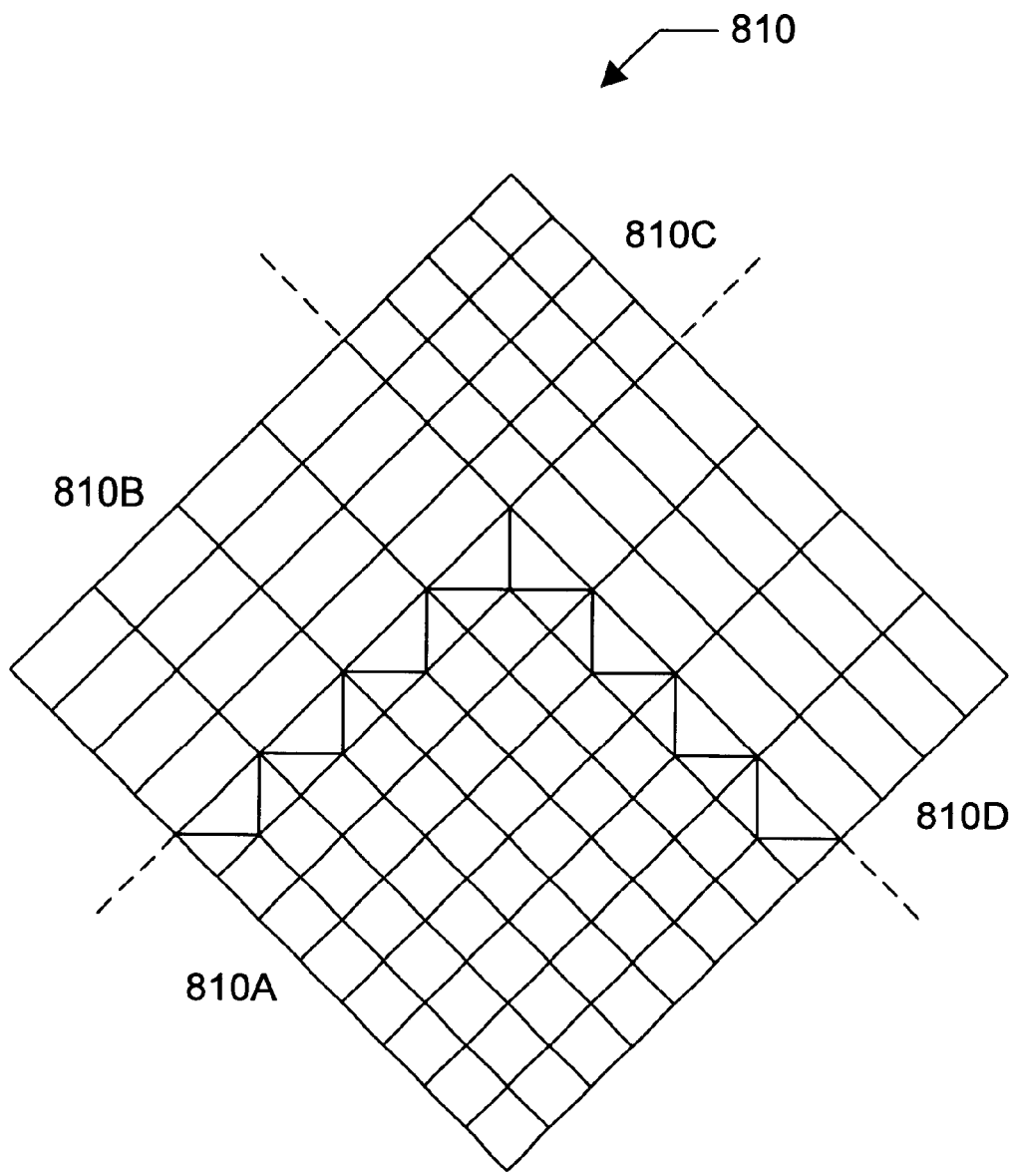
FIG. 21 depicts a surface portion that utilizes half-rez mode according to a preferred embodiment of the present invention in order to reduce aliasing effects for a given object.

FIGS. 19–21—Half-resolution Mode

One common artifact in 3-D graphics is when an object in the background of a scene (represented in low resolution) moves to the foreground of a scene (into high resolution). Typically this transition from low to high resolution occurs as a heavyweight switch, resulting in an unappealing (and unrealistic) visual effect. One solution to this problem is to represent the edge (or edges) of a surface portion of an object in an intermediate resolution during the transition from low to high resolution. This representation is referred to as "half-resolution", or "half-rez", mode. The use of this mode is described below as it relates to vertex rasters, although half-rez mode is also applicable to generalized triangle mesh formats.

Referring now to FIG. 19, the format of the "SetEdge-HalfRez" command is shown. As depicted, the command includes four one-bit operands (el, et, er, and eb), which may be used to independently set half-rez mode for each of the four sides of the current vertex raster. (Note that when half-rez mode is used without vertex raster mode, only the top and bottom bits are applicable in one embodiment).

FIGS. 20A–D illustrate surface portions with each of the four bits turned on. For example, surface portion 800A shown in FIG. 20A has the "el" (left edge) bit turned on. Surface portions 800B–D shown in FIGS. 20B–D have the "er", "et", "eb" bits set respectively. Note that any combination of the four bits may be set (that is, a surface portion may have more than one edge represented in half-rez mode).

The use of half-rez mode allows more realistic visual effects. As an object moves from low-resolution to high-resolution (or vice-versa), surface portions may be intermediately represented as half-resolution. In this manner, a "patch" may adapt its tessellation to what is required in the area.

An example of half-rez mode is given by surface portion 810 in FIG. 21. As shown, surface portion 810 includes sub-portions 810A–D. Sub-portion 810A, being closest to the viewer, is represented as a 9×9 square grid of vertices, while sub-portions 810B–D (which are farther away) are represented as 5×5 arrays of vertices. In order to lessen the abruptness of the resolution change between surface sub-portions 810, two edges of sub-portion 810A are represented in half-rez mode.

Figure 22:
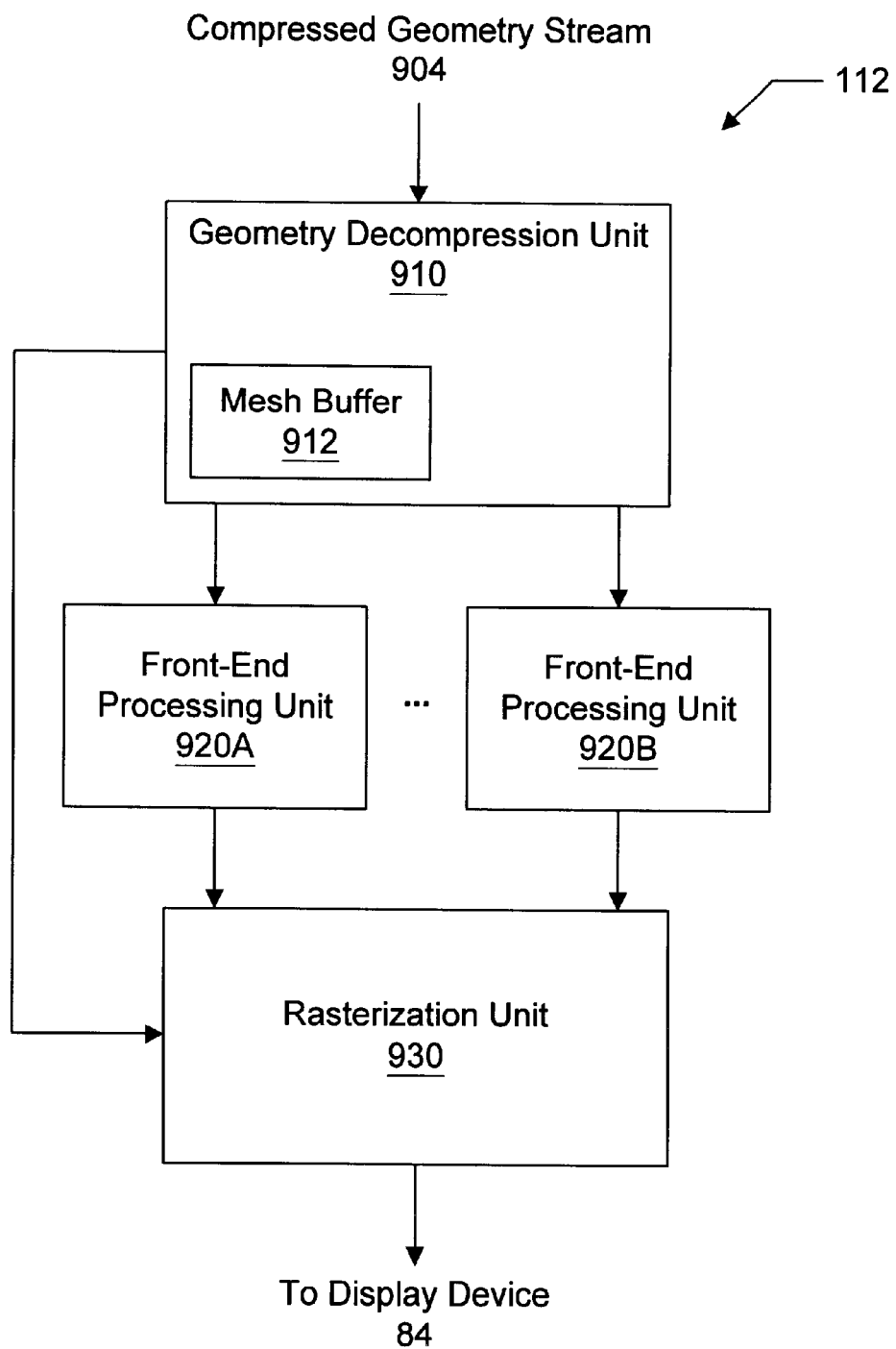
FIG. 22 depicts a block diagram of a graphics sub-system according to one embodiment of the present invention.

FIG. 22—Decompression Hardware

A block diagram of one embodiment of graphics accelerator 112 depicted in FIG. 3 is shown with reference to FIG. 22. As shown, graphics accelerator 112 receives a compressed geometry stream 904. Stream 904 may be conveyed from main memory via a system bus, or from a separate computer system via a network. Compressed geometry stream 904 may include 3-D geometry data compressed using a variety of different techniques, such as those disclosed herein and in the Applicant's parent patent application. Compressed geometry stream 904 may also include uncompressed 3-D geometry data. Both the compressed and uncompressed geometry data describes vertices (and associated attributes) which are usable for assembling into drawing primitives (typically triangles) which may then be rendered by a graphics pipeline. Stream 904 also typically includes control information for the corresponding data.

The data in geometry stream 904 is conveyed to a geometry decompression unit (GDU) 910. In one embodiment, GDU 910 receives stream 904, compresses any compressed geometry data, and assembles a plurality of drawing primitives using connectivity information specified in stream 904. As will described below, GDU 910 includes a mesh buffer 912, which is usable for decompression of geometry data represented in vertex raster or generalized triangle mesh format. The primitives assembled by GDU 910 are then conveyed to one or more front-end processing units 920. Although two units (920A–B) are shown in FIG. 22 for simplicity, graphics accelerator 112 may include other configurations in alternative embodiments.

In one embodiment, mesh buffer 912 includes a fixed number of storage locations usable for storing parameter values associated with one or more vertices. In this manner, vertices (and corresponding parameters values) which are used in forming multiple primitives may be pushed into mesh buffer 912 upon first use. When later needed, these values may be accessed from mesh buffer 912 which avoids the need to re-specify these vertices in compressed stream 904. In one embodiment, mesh buffer 912 is organized as a stack, and is accessed by providing an offset into the stack.

Generally speaking, front-end processing units 920 are responsible for transforming vertices from a model space coordinate system (typically defined by the graphics program which generated the geometry data) to a coordinate system specified by the display device. This series of steps, commonly referred to as the front-end of the graphics pipeline, includes such operations as modeling transformation, perspective division, clipping, trivial rejection of primitives, and screen space transformation. The drawing primitives generated by processing units 920 are represented in a coordinate system (screen or device space) which may easily be drawn by rasterization unit 930.

In one embodiment, rasterization unit 930 receives drawing primitives represented in device space coordinates. Rasterization unit 930 then renders these primitives on display device 84 using processes such as edge interpolation, span interpolation, and texture mapping. Unit 930 may optionally include a z-buffer unit for performing hidden surface removal.

In an alternate embodiment of graphics accelerator 112, GDU 910 performs decompression of stream 904, but does not assemble the vertices into triangle primitives. Instead, the vertices are tagged and conveyed to front-end processing units 920. Similar to the embodiment described above, units 920A–B perform transformation operations on the received vertices, outputting vertices represented in device coordinate space. Concurrently, GDU 910 sends connectivity information to rasterization unit 930, referencing the tagged vertices being processed by units 920. In this embodiment, rasterization unit 930 assembles the received vertices into primitives for rendering on display device 84.

Figure 23:
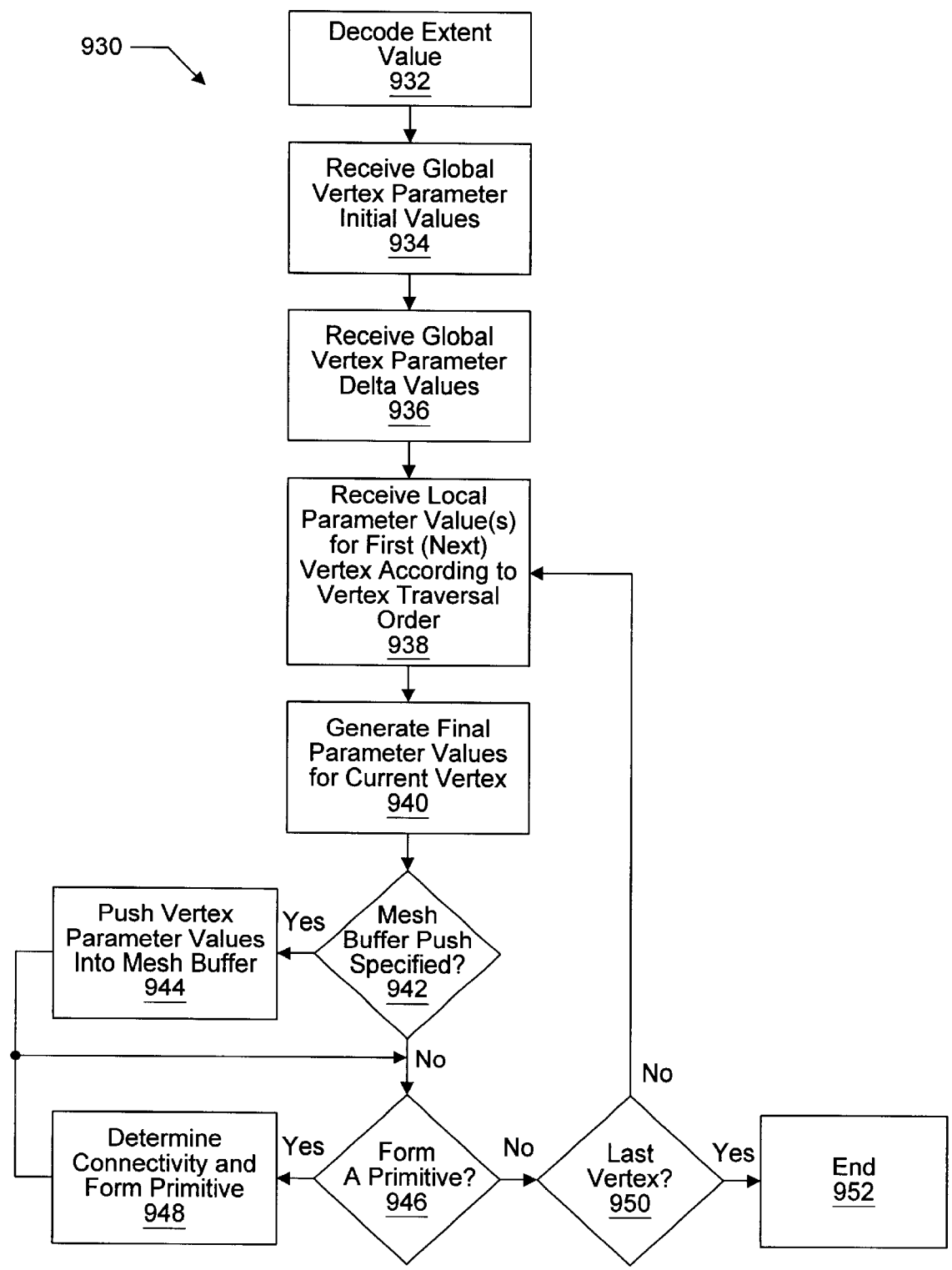
FIG. 23 illustrates a generalized flowchart for performing decompression of regularly tiled surface portions according to one embodiment of the present invention.
Figure 24:
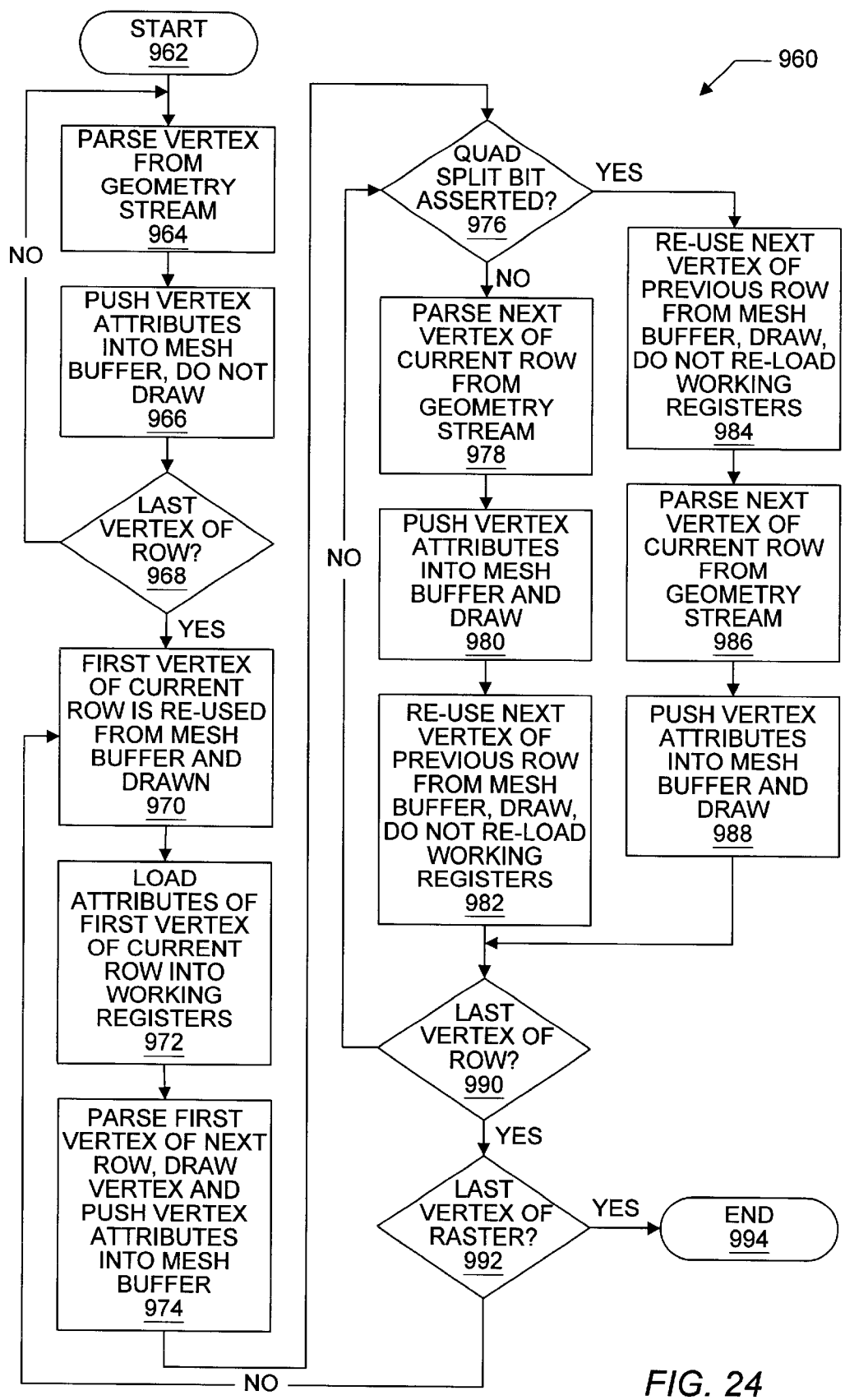
FIG. 24 illustrates a flowchart for performing decompression of regularly tiled surface portions which include quad split bits.
Figure 25:
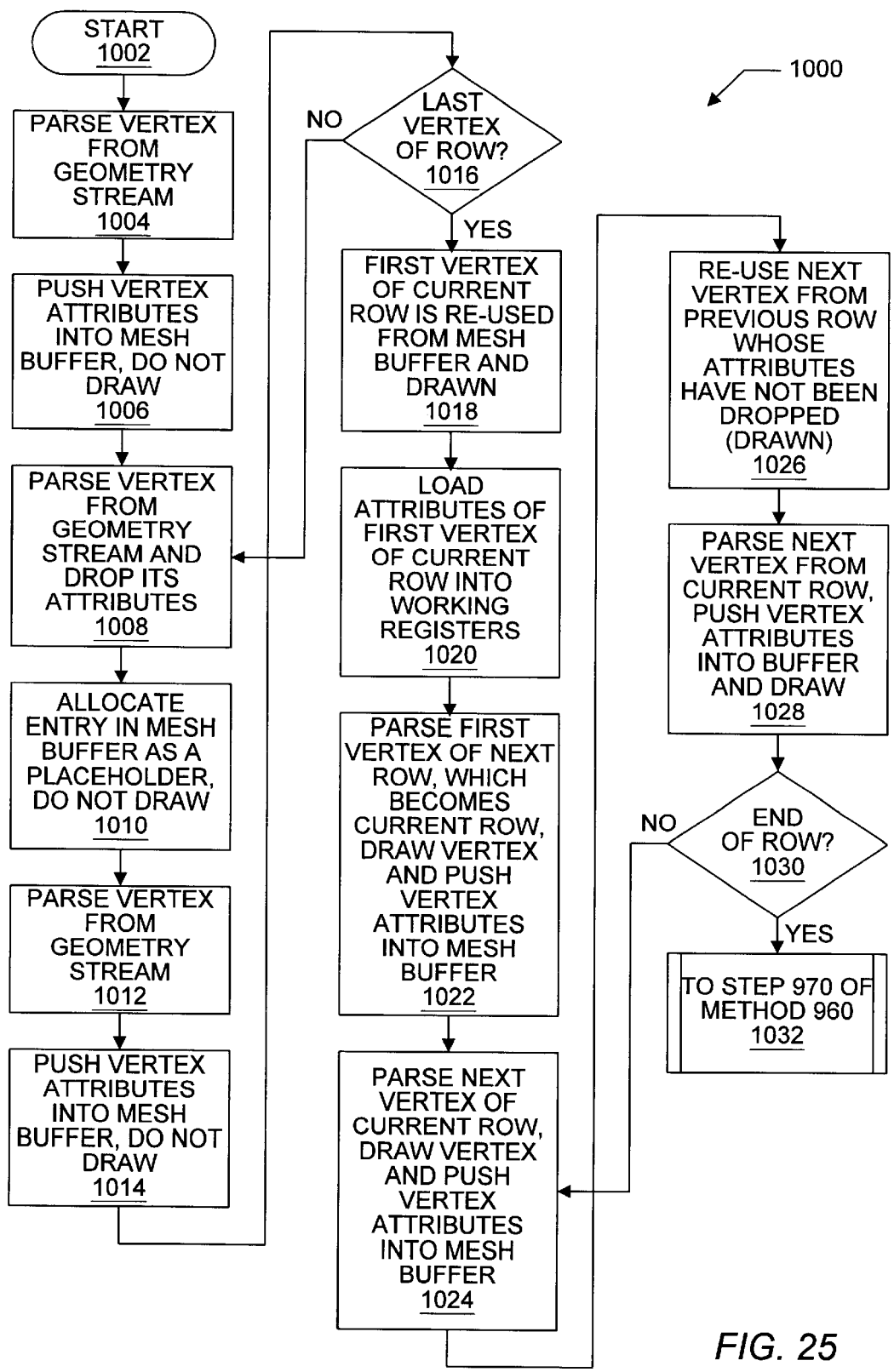
FIG. 25 illustrates a flowchart for performing decompression of regularly tiled surface portions which include a bottom edge represented in a half-resolution mode.

FIGS. 23–25—Decompression Flowcharts

A generalized flowchart depicting a decompression method 930 according to one embodiment of the present invention is shown with reference to FIG. 23. As shown, method 930 first includes a step 932, in which an extent of the surface portion being represented is set within a decompression unit, such as GDU 910 shown in FIG. 22. In one embodiment, the extent of a surface portion may be encoded using a format such as the "SetVertexRasterSize" command described above with reference to FIG. 7. Other encodings for the extent value may be utilized as well in other embodiments.

The extent value indicates to the decompression hardware the arrangement of vertices within the surface portion. This allows the decompression hardware to properly connect a stream of vertex data into the correct drawing primitives. In different embodiments, the extent value may indicate the shape of a surface portion, the number of vertices within the surface portion, or both. The extent value may also be a value which indicates that the vertices of the surface portion being represented are arranged according to one of a predefined number of arrangements recognized by GDU 910. As described above, the "SetVertexRasterSize" command specifies that the surface portion includes either 25, 81, or 289 vertices arranged in a regular grid with an equal number of rows and columns. In a different embodiment, this command may specify that the grid is organized in an alternate fashion.

Method 930 next includes steps 934 and 936, in which global parameter values and corresponding delta values are initialized. In one embodiment, step 934 includes decoding the "SetVertexRasterStart" command described above with reference to FIG. 8. Execution of this command, in one embodiment, sets initial values in vector registers 0–4. Each of the 5 vector registers is predefined to represent a specific vertex parameter. In alternate embodiments, other vertex parameters may be added as well. These initial values of the vertex parameters typically correspond to values of the vertex parameters at the first vertex traversed within the surface portion (see FIG. 9).

In one embodiment, step 936 includes decoding the "SetVertexRasterStep" commands described above with reference to FIGS. 10A–B. Execution of this command, in one embodiment, sets delta values for the predetermined vertex parameters corresponding to the registers. It is noted that even though a register is reserved for a particular vertex parameter (e.g., color), for a given surface portion, that vertex parameter may not necessarily be specified in a given geometry stream.

As described above, there are two "step" commands specified in one embodiment of the present invention. One step command sets delta values for components of a specified vertex parameter along a first direction (such as the direction taken when traversing vertices along a given row of the surface portion). A second step command sets delta values similarly along a second direction (such as between columns) within the surface portion.

As described above, specifying vertex parameter values in the manner described above (steps 934 and 936) is referred to as global parameter specification. This is in contrast to the per-vertex (or local) specification of vertex parameter values also employed according to one embodiment of the present invention. Global parameter specification may be performed differently in other embodiments. For example, changes in a vertex parameter may be specified through initial values and one or more equations which define the parameter relative to its position within the vertex traversal order. Other techniques are also possible. It is further noted that it is possible to represent a surface portion as a vertex raster without encoding any globally specified parameters. Compression is still achieved since the connectivity (and, hence, the mesh buffer push bits) are specified implicitly by the extent value.

Method 930 next includes step 938, in which GDU 910 (or other decompression unit) begins accessing the stream of per-vertex data which includes local values for the vertex parameters. As described above, in one embodiment, specification of an extent value implies a predefined vertex traversal order. Furthermore, in one embodiment, it is known before receiving the per-vertex data, what parameters are specified for each vertex. (In one embodiment, this information is determined by control commands such as those described with references to FIGS. 13A–B). With the number of vertices known, as well as the number of parameters per vertex, the stream of per-vertex data may be accurately processed.

Consider a given surface portion with two parameters (color and normals) specified locally. If it is known that only two parameters are specified for each vertex, GDU 910 can correctly determine that after accessing two values at the beginning of the stream of per-vertex data, subsequent parameter values are associated with the next vertex in the vertex traversal order. In such a manner, GDU 910 is able to access local parameter values for the first (or next) vertex specified by the current vertex raster representation.

The stream of per-vertex data may be encoded using a variety of different techniques. In one embodiment, each of the parameters in the per-vertex stream is of a predetermined length, facilitating the retrieval of data. In a preferred embodiment, the per-vertex stream is encoded using the header-body technique described in the Applicant's parent patent application. Generally speaking, the per-vertex data includes fixed-length header portions which are usable to determine a length of a corresponding variable-length body portions. Each header-body pair includes a data portion that includes one or more local data values. The data portion may be included wholly in the fixed-length header (indicating a zero-length body portion), wholly within the body portion, or in both the header and body. To implement a high-speed decompression unit, header and body pairs may be separated in the data stream by header and body pairs of other instructions.

For example, consider the following sequence of header-body pairs: H1, B0, H2, B1, H3, B2, etc. This indicates that header-body pair H1-B1 are separated within the per-vertex stream by the body portion of the previous pair (B0) and the header portion of the next pair (H2). This allows GDU 910 sufficient time to determine the length of the corresponding body portion. In one embodiment, the body length is determined by presenting the fixed-length header portion to a decompression table. (In one embodiment, there is a separate decompression table for each type of parameter). In response, the decompression table returns one or more decompression parameters corresponding to the current header-body pair being processed. These decompression parameters may include, but are not limited to, the amount of the data portion present in the header portion, the length of the body portion, whether the values in the data portion are absolute or relative, and a normalization coefficient for the values in the data portion.

As described above, various decompression parameters are specified, in one embodiment, for each header-body pair (which includes a vertex parameter value for the current vertex being processed). In step 940, these decompression parameters and the globally specified values are utilized to generate a final vertex parameter value. In one embodiment, a final vertex parameter value may be generated a) solely from globally specified values, b) solely from the per-vertex stream, or c) using a combination of the globally specified values and the per-vertex data.

For case a), a final vertex parameter value is generated by applying the delta values to the current working value (which is either the initial value or the value for the previous vertex). For case b), the final parameter value is generated according to the manner in which the value is encoded. If the value is absolutely specified, the normalization coefficient (if any) is applied to the value in the data portion in order to generate the final value. If the per-vertex value is delta-encoded, the normalized data value is added to the value of the parameter at the previous vertex.

Compression according to the present invention also allows delta-delta encoding of values in one embodiment. This is useful if a certain vertex parameter changes in a slightly irregular fashion. (In many instances, the delta-delta value for a particular vertex may be zero, effectively indicating the last delta is to be applied again to generate the final parameter value for the particular vertex). In one embodiment, the use of delta-delta encoding is enabled through a control instruction such as the "SetState" command described above with reference to FIG. 13A. In this embodiment, setting of the dde bit alters the interpretation of the absolute/relative bit within the decompression table, causing an absolute setting within a decompression table to indicate relative (delta) encoding, with relative encoding now specifying delta-delta encoding. Because delta-delta values may in some instances be smaller than delta values, compression efficiency is enhanced through the use of this technique. Thus, to generate a final vertex parameter for case c), the parameter value for the previous vertex, the previous delta, and the delta-delta value for the current vertex are all added.

With the final parameter values generated for a particular vertex in step 940, a determination is made whether to perform a mesh buffer push in step 942. This determination is made using the previously specified extent value as well as the current vertex position. For example, in one embodiment, it is predetermined that the entire first row of vertices are all pushed into the mesh buffer for later use. This push operation is performed in step 944. In one embodiment, the vertex and all associated parameters are all pushed into the mesh buffer.

In step 946, a determination is made whether or not a primitive is to be assembled. For example, in one embodiment, no primitives are assembled until vertices on the second row are accessed. For the vertices on the first row, then, step 950 is performed subsequent to step 946. If the determination is made that a primitive is to be assembled, method 930 next proceeds with step 948.

In step 948, connectivity information is analyzed in order to determine which vertices are to be used (in addition to the current vertex) in order to assemble the drawing primitive. In one embodiment, connectivity information includes that implicitly defined by the extent value as well as quad split information. It is noted that after processing a given vertex, a plurality of primitives may be formed. Accordingly, after execution of step 948, method 930 returns to the determination step of 946.

Once all primitives have been assembled for the current vertex, a determination is made in step 950 whether the current vertex is the last vertex (as specified by the previously specified vertex traversal order) within the surface portion. If the current vertex is not the last vertex, the next vertex is processed in step 938 and execution of method 930 continues. If the current vertex is the last vertex, however, method 930 concludes with step 952.

If a step vertex raster command is executed subsequent to completion of method 930, the next surface portion may be processed by using the values of the global parameters from the last vertex of the previous raster representation and proceeding to step 938 of method 930. The next stream of per-vertex data may then be processed as described above.

Method 930 described above gives a general overview of one embodiment of the decompression process. Method 960, shown in FIG. 24, provides a more detailed implementation which handles both implicit and explicit connectivity information. Method 960 is first described with reference to surface portion 300 depicted in FIG. 6, in which the quadrilaterals formed by neighboring vertices are all split in the same (default) direction. For purposes of the following examples, the vertex traversal order is assumed to be that shown in FIG. 9 (beginning from the lower left corner). Accordingly, the vertex numbers utilized in the following examples may be understood from FIG. 9. For instance, vertex 2 is the middle vertex on the bottom row in each of the examples given below. It is noted that many other vertex traversal orders are also possible. It is further noted that any of the procedures for generation of final parameter values may be employed within method 960.

FIG. 23 describes the notion of forming a primitive. With reference to FIG. 24, a primitive is considered to be formed when all of its vertices are "drawn" (passed to units 920 for processing). In one embodiment, replacement codes such as those used in generalized triangle strip format dictate how drawn vertices are combined to form triangle primitives.

Proceeding from initial state 962, method 960 proceeds to step 964, in which a vertex and its associated parameters are accessed from compressed geometry stream 904 by GDU 910. For the first row of vertices in surface portion 300 (vertices 0–4), all vertex parameter values are pushed into mesh buffer 912 in step 966. These vertices are not drawn, however, indicating that no primitives are formed. A determination is made in step 968 as to whether the current vertex is the last vertex of the first row. If the current vertex is not the last vertex of the first row, method 960 returns to step 964 and processes the next vertex.

If the current vertex is at the end of the first row, however, the first vertex of the current row (vertex 0 in FIG. 9) is accessed from mesh buffer 912 and drawn in step 970. The attributes of this vertex are next loaded into GDU 910 registers in step 972. These loaded values are used, if needed, to calculate parameters values of the first vertex of the next row (vertex 5), which are accessed in step 974. The parameters of vertex 5 are also pushed into mesh buffer 912 and then drawn in step 974.

In step 976, a determination is made as to whether a quad split bit is set for the current quadrilateral within compressed geometry stream. In one embodiment, a de-asserted quad split bit indicates that a quadrilateral should be tessellated in the default direction (upper right corner to lower left). If this bit is set, however, the quad is split from the upper left corner to lower right. If a quad split bit is not specified, the quad is tessellated in a predetermined default direction in one embodiment.

In one embodiment of a vertex raster representation of surface portion 300, no quad split bits are set. Accordingly, method 960 proceeds to step 978, in which parameters of the next vertex of the current row (vertex 6) are accessed. These parameters are pushed into mesh buffer 912 and the vertex is drawn in step 980. A first triangle primitive within surface portion 300 is now formed, with vertices 0, 5, and 6 all being drawn. The next triangle primitive is formed in step 982, in which the next vertex of the previous row (vertex 1) is drawn. This steps effectively forms the primitive defined by vertices 5, 6, and 1.

In step 990, the current vertex is tested to determine if it is the last vertex in the current row. If the vertex is not the last in the current row, method 960 returns to step 976 to check the next quad split bit. Method 960 continues as described above, forming the remaining triangle primitives between the bottom two rows of vertices. When the last vertex in the second row is detected in step 990, a further check is made in step 992 to determine if the current vertex is the last in the surface portion. Since this is not the case in this example, method 960 proceeds with step 970, in which the first vertex of the current row (vertex 5) is accessed from mesh buffer 912 and drawn (again). Then vertex 10 of the third row is drawn in step 974. The quad split bit for this vertex is checked in step 976, and formation of triangle primitives continues as described above. Method 960 eventually exits at step 994 when vertex 24 is detected in step 992.

Next, method 960 is described using surface portion 700 as input. Method 960 begins as described above, accessing vertex parameter values for vertices 0–4 and pushing these values into mesh buffer 912 in steps 964–966. When vertex 4 is detected in step 968, vertex 0 is retrieved from mesh buffer 912 in step 970. Then the attributes of vertex 5 are accessed from stream 904 and drawn in step 976. So far, the steps for surface portion 700 correspond to those taken for surface portion 300, with vertices 0 and 5 both being drawn.

Since the quad split bit for the first quadrilateral in surface portion 700 is split, however, method 960 next proceeds to step 984, in which the next vertex of the previous row (vertex 1) is accessed from mesh buffer 912 and drawn. This forms a triangle defined by vertices 0, 5, and 1. In steps 986 and 988, a second triangle is formed from vertices 5, 1, and 6. Method 960 then returns to step 976, where the next quad split bit is checked. Based on the result of this determination, two more triangles are formed and the method returns to step 976. When all triangles are formed for the current row, method 960 returns to step 970. Decompression of the remainder of surface portion 700 proceeds as described above.

FIG. 25 depicts a method for decompressing a surface portion in which a bottom edge is designated as being half-rez (as described above with reference to FIG. 19). One example of such a surface portion is portion 800D in FIG. 20D. As depicted in FIG. 20D, some vertices on a half-rez edge are not utilized in forming any of the triangle primitives within surface portion 800D. Method 1000 shown in FIG. 25 accounts for this fact.

From initial state 1002, method 1000 proceeds to step 1004, in which the first vertex (vertex 0) is accessed from stream 904. Vertex 0 and its attributes are pushed into mesh buffer 912 in step 1006. Vertex 1 and associated parameters are accessed in step 1008. Because vertex 1 is not utilized for triangle formation, however, the attributes accessed in step 1008 are not used. In spite of the fact that these attributes are not used, a dummy mesh buffer push is performed in step 1010. This is done so that subsequent rows may access mesh buffer 912 in the same fashion whether or not the bottom edge is represented in half-rez mode or not.

In steps 1012–1014, vertex 2 and its attributes are retrieved from stream 904 and pushed into mesh buffer 912. Since vertex 2 is not the last vertex in the row, method 1000 returns to step 1008. This results in vertex 3 being allocated a dummy position in mesh buffer 912, and vertex 4 having its attributes pushed into an "actual" position within mesh buffer 912.

At this point, vertices 0–4 are pushed into mesh buffer 912 with either placeholder or actual entries. Method 1000 next proceeds to steps 1018–1020, in which vertex 0 is accessed from mesh buffer 912 and drawn. In step 1022, vertex 5 is accessed from stream 904, drawn, and pushed into mesh buffer 912. Next, vertex 6 is accessed, drawn, and pushed in step 1024. This completes formation of the triangle primitive defined by vertices, 0, 5, and 6.

Method 1000 continues with step 1026, in which the next vertex from the previous row whose attributes have not been dropped is drawn. This corresponds to vertex 2, since vertex 1 is not used in triangle formation This step also completes formation of the triangle defined by vertices 0, 2, and 6. (These vertices are used instead of three most recently drawn vertices since half-rez edges correspond to "star" triangle strips. These formations are drawn in generalized triangle strip format using the "replace middlest" vertex command). Next, in step 1028, the next vertex from the current row, vertex 7, is accessed, pushed, and drawn, forming a primitive from vertices 6, 2, and 7.

In step 1030, a determination is made that the end of the row has not been reached. Thus, method 1000 continues with step 1024. Steps 1024–1028 repeat, forming three primitives using vertex groups (2, 7, 8),(2, 8, ,4) and (8, 4, 9), respectively.

With the first row of primitives drawn, method 1000 continues processing by executing steps 970–994 of method 960 until the last vertex of surface portion 800D is reached.

Method 1000 is usable to perform decompression on a regularly tiled surface portion in which the bottom edge is represented in half resolution. Decompression of surface portions in which other edges are represented in half-rez is performed similarly. For more information, refer to related co-pending application entitled "Method of Producing a Sequence of Triangles From a Vertex Raster With and Without Half Resolution Edges While Decompressing a Compressed Geometry Stream", filed Jan. 15, 1998 by Jeffrey M. Chan. It is noted that in alternate embodiments, quad split bits and half-rez edges may be processed differently.

Although the system and method of the present invention have been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for decompressing compressed 3-D geometry data, wherein said compressed 3-D geometry data represents a first regular surface portion of a 3-D graphical object, said method comprising:

receiving said compressed 3-D geometry data, wherein said compressed 3-D geometry data includes vertex parameter values corresponding to vertices within said first regular surface portion, wherein said compressed 3-D geometry data includes an extent value which specifies an arrangement of said vertices within said first regular surface portion, wherein said compressed 3-D geometry data further includes encoded vertex parameter values corresponding to said vertices within said first regular surface portion, and wherein said compressed 3-D geometry data encodes said first regular surface portion in less space than a comparable irregular surface portion;

decoding said extent value to determine said arrangement of said vertices within said first regular surface portion;

decoding said encoded vertex parameter values corresponding to said vertices within said first regular surface portion;

generating a plurality of geometric primitives from said encoded vertex parameter values according to said arrangement of said vertices within said first regular surface portion.

2. The method of claim 1, wherein said encoded vertex parameters are selected from the group consisting of: (i) position values, (ii) color values, (iii) normal values, (iv) texture map coordinates, (v) bump mapping vectors, (vi) displacement mapping vectors, (vii) surface material properties.

3. The method of claim 1, wherein said extent value specifies a number of vertices within said first regular surface portion.

4. The method of claim 1, wherein said vertices within said first regular surface portion are organized in a regular grid, and wherein said extent value specifies dimensions of said regular grid.

5. The method of claim 1, wherein said extent value specifies a manner in which neighboring vertices within said first regular surface portion are to be connected to form said plurality of geometric primitives.

6. The method of claim 1, wherein said decoding said encoded vertex parameter values includes decoding an initial value for a first vertex parameter.

7. The method of claim 6, wherein said decoding said encoded vertex parameter values further includes decoding one or more delta values for said first vertex parameter.

8. The method of claim 7, wherein said initial value for said first vertex parameter and said one or more delta values for said first vertex parameter are usable to generate final values of said first vertex parameter for said vertices within said first regular surface portion.

9. The method of claim 8, wherein said final values of said first vertex parameter for said vertices within said first regular surface portion are generated according to a predetermined vertex traversal order specified by said extent value.

10. The method of claim 1, wherein said decoding said encoded vertex parameter values includes decoding a stream of per-vertex data, wherein said stream of per-vertex data includes one or more encoded vertex parameter values for each of said vertices within said first regular surface portion.

11. The method of claim 10, further comprising encoding an indication of which vertex parameter values are encoded in said per-vertex data stream.

12. The method of claim 10 wherein said encoded vertex parameter values in said per-vertex data stream are selected from the group consisting of: (i) position, (ii) color, (iii) normals, (iv) texture map coordinates, (v) z-displacements, and (vi) surface material properties.

13. The method of claim 10, wherein said one or more encoded vertex parameter values for each of said vertices within said first regular surface portion are represented in a format selected from the group consisting of: (i) absolute value, (ii) delta-encoded value, (iii) delta-delta encoded value.

14. The method of claim 8, wherein said decoding said encoded vertex parameter values includes decoding a stream of per-vertex data which includes a value of a second vertex parameter for each of said vertices within said first regular surface portion.

15. The method of claim 7, wherein said initial value for said first vertex parameter and said one or more delta values for said first vertex parameter are usable to generate intermediate values of said first vertex parameter for said vertices within said first surface portion, wherein said intermediate values of said first vertex parameter include a first intermediate value corresponding to a first vertex within said first regular surface portion.

16. The method of claim 15, wherein said decoding said encoded vertex parameter values further includes decoding a stream of per-vertex data, wherein said stream of per-vertex data includes a local value of said first vertex parameter for each of said vertices within said first regular surface portion, wherein said stream of per-vertex data includes a first local value for said first vertex parameter at said first vertex.

17. The method of claim 16, further comprising generating a final value for said first vertex parameter at said first vertex using said first intermediate value and said first local value.

18. The method of claim 1, wherein said decoding said encoded vertex parameter values includes storing parameter values corresponding to selected ones of said vertices within said first regular surface portion into a mesh buffer for subsequent use.

19. The method of claim 18, wherein said selected ones of said vertices within said first regular surface portion are selected according to said extent value.

20. The method of claim 18, wherein said generating said plurality of geometric primitives includes referencing parameters values previously stored in said mesh buffer.

21. The method of claim 1, wherein said decoding said encoded vertex parameter values includes decoding explicit connectivity information, wherein said explicit connectivity information is usable to determine how each of a plurality of surface sub-portions within said first regular surface portion are divided into drawing primitives, wherein each of said plurality of surface sub-portions corresponds to an area between neighboring vertices within said first regular surface portion.

22. The method of claim 21, wherein said drawing primitives are triangle primitives.

23. The method of claim 1, further comprising decoding a reduced resolution mode indication that specifies one or more edges of said first regular surface portion are to be represented in a lower resolution than an interior of said first regular surface portion.

24. The method of claim 23, wherein said generating said plurality of geometric primitives from said encoded vertex parameter values for said one or more edges of said first regular surface portion is performed according to said reduced resolution mode.

25. The method of claim 1, further comprising decoding an indication which specifies that a portion of said compressed 3-D geometry data corresponding to said first regular surface portion is to be re-used in decoding 3-D geometry data corresponding to a second regular surface portion of said 3-D graphical object.

26. The method of claim 25, wherein said second regular surface portion is adjacent to said first regular surface portion.

27. The method of claim 25, wherein said indication includes a direction value which specifies a direction of said second regular surface portion relative to said first surface portion.

28. A method for decompressing compressed 3-D geometry data, wherein said compressed 3-D geometry data represents a first surface portion of a 3-D graphical object, said method comprising:

receiving said compressed 3-D geometry data, wherein said compressed 3-D geometry data includes vertex parameter values corresponding to vertices within said first surface portion, wherein said compressed 3-D geometry data includes an extent value which specifies an arrangement of said vertices within said first surface portion, and wherein said compressed 3-D geometry data further includes encoded vertex parameter values corresponding to said vertices within said first surface portion;

decoding said extent value to determine said arrangement of said vertices within said first surface portion;

decoding one or more initial vertex parameter values, wherein each of said one or more initial vertex parameter values corresponds to a vertex parameter specified within said compressed 3-D geometry data;

decoding one or more delta values, wherein each of said one or more delta values corresponds to one of said one or more initial vertex parameter values;

decoding a stream of per-vertex data which specifies one or more vertex parameters for each of said vertices within said first surface portion;

generating final vertex parameter values for said vertices within said first surface portion utilizing said one or more initial vertex parameter values, said one or more delta values, and said stream of per-vertex data;

generating a plurality of geometric primitives which include said final vertex parameter values, wherein said plurality of geometric primitives are generated according to said arrangement of said vertices within said first surface portion specified by said extent value.

29. A computer system for decompressing compressed 3-D geometry data, wherein said compressed 3-D geometry data represents a first surface portion of a 3-D graphical object, said computer system comprising:

a decompression unit coupled to receive compressed 3-D geometry data, wherein said compressed 3-D geometry data includes vertex parameter values corresponding to vertices within said first surface portion, wherein said compressed 3-D geometry data includes an extent value which specifies an arrangement of said vertices within said first surface portion, and wherein said compressed 3-D geometry data further includes encoded vertex parameter values corresponding to said vertices within said first surface portion;

wherein said decompression unit is configured to decode said extent value in order to determine said arrangement of said vertices within said first surface portion, and wherein said decompression unit is further configured to decode said encoded vertex parameter values corresponding to said vertices within said first surface portion, and wherein said decompression unit is still further configured to generate a plurality of geometric primitives from said encoded vertex parameter values according to said arrangement of said vertices within said first surface portion specified by said extent value.

30. The computer system of claim 29, further comprising a rendering unit, wherein said rendering unit is coupled to receive said plurality of geometric primitives.

31. The computer system of claim 30, further comprising a display device, wherein said rendering unit is configured to render said plurality of geometric primitives on said display device to represent said 3-D graphical object.

32. A graphics sub-system for decompressing compressed 3-D geometry data, wherein said compressed 3-D geometry data represents a first surface portion of a 3-D graphical object, said graphics sub-system comprising:

a decompression unit coupled to receive compressed 3-D geometry data, wherein said compressed 3-D geometry data includes vertex parameter values corresponding to vertices within said first surface portion, wherein said compressed 3-D geometry data includes an extent value which specifies an arrangement of said vertices within said first surface portion, and wherein said compressed 3-D geometry data further includes encoded vertex parameter values corresponding to said vertices within said first surface portion;

wherein said decompression unit is configured to decode said extent value in order to determine said arrangement of said vertices within said first surface portion, and wherein said decompression unit is further configured to decode said encoded vertex parameter values corresponding to said vertices within said first surface portion, thereby producing decoded vertex parameter values;

and wherein said decompression unit is still further configured to generate a plurality of geometric primitives from said decoded vertex parameter values according to said arrangement of said vertices within said first surface portion specified by said extent value.

33. The graphics sub-system of claim 32, wherein said encoded vertex parameters are selected from the group consisting of: (i) position values, (ii) color values, (iii) normal values, (iv) texture map coordinates, (v) bump mapping vectors, (vi) displacement mapping vectors, (vii) surface material properties.

34. The graphics sub-system of claim 32, wherein said graphics sub-system includes one or more geometry processors coupled to receive said plurality of geometric primitives from said decompression unit, wherein said one or more geometry processors are configured to generate a plurality of transformed geometric primitives represented in screen space coordinates.

35. The graphics sub-system of claim 34, wherein said graphics sub-system further includes a rasterization unit coupled to receive said plurality of transformed geometric primitives from said one or more geometry processors, wherein said rasterization is configured to render said plurality of transformed geometry primitives upon a display device.

36. The graphics sub-system of claim 32, wherein said decompression unit includes a mesh buffer for storing vertex parameter values, wherein said decompression unit is configured to store selected decoded parameter values in said mesh buffer for subsequent use.

37. The graphics sub-system of claim 36, wherein said decompression unit is configured to re-use parameter values stored in said mesh buffer in order to form selected ones of said plurality of geometric primitives.

38. The graphics sub-system of claim 32, wherein said decompression unit is configured to decode an initial value for a first vertex parameter, wherein said initial value corresponds to a value of said first vertex parameter at an initial vertex of a vertex traversal order specified by said extent value.

39. The graphics sub-system of claim 38, wherein said decompression unit is configured to decode an indication of how said first vertex parameter changes value across said first surface portion according to said vertex traversal order.

40. The graphics sub-system of claim 39, wherein said decompression unit is configured to generate values of said first vertex parameter for said vertices within said first surface portion by utilizing said initial value of said first vertex parameter and said indication of how said first vertex parameter changes value across said first surface portion.

41. The graphics sub-system of claim 32, wherein said decompression unit is configured to decode a stream of per-vertex data which includes one or more vertex parameter values for each of said vertices within said first surface portion.

42. The graphics sub-system of claim 41, wherein said one or more vertex parameter values within said stream of per-vertex data are encoded in a format selected from the group consisting of: (i) absolute encoding, (ii) delta encoding, and (iii) delta-delta encoding.

43. The graphics subsystem of claim 32, wherein said decompression unit is configured to decode connectivity information included in said compressed 3-D geometry data, wherein said decompression unit is configured to form said plurality of geometric primitives according to said connectivity information.

44. The graphics sub-system of claim 43, wherein said connectivity information includes a plurality of quad split bits.

45. The graphics sub-system of claim 32, wherein said decompression unit is configured to decode a reduced resolution mode indication that specifies one or more edges of said first surface portion are to be represented in a lower resolution than an interior of said first surface portion.

46. The graphics sub-system of claim 45, wherein said decompression unit is configured to generate said plurality of geometric primitives which are included in said one or more edges of said first surface portion according to said reduced resolution mode.

47. The graphics sub-system of claim 32, wherein said decompression unit is configured to decode an indication which specifies that a portion of said compressed 3-D geometry data corresponding to said first surface portion is to be re-used in decoding 3-D geometry data corresponding to a second surface portion of said 3-D graphical object.

48. The graphics sub-system of claim 47, wherein said second surface portion is adjacent to said first surface portion.

49. The graphics sub-system of claim 48, wherein said indication includes a direction value which specifies a direction of said second surface portion relative to said first surface portion.

50. A graphics sub-system for decompressing compressed 3-D geometry data, wherein said compressed 3-D geometry data represents a first surface portion of a 3-D graphical object, said graphics sub-system comprising:

a receiving means for receiving said compressed 3-D geometry data, wherein said compressed 3-D geometry data includes vertex parameter values corresponding to vertices within said first surface portion, wherein said compressed 3-D geometry data includes an extent value which specifies an arrangement of said vertices within said first surface portion, and wherein said compressed 3-D geometry data further includes encoded vertex parameter values corresponding to said vertices within said first surface portion;

a decoding means for decoding said extent value to determine said arrangement of said vertices within said first surface portion, wherein said decoding means is further configured to decode said encoded vertex parameter values corresponding to said vertices within said first surface portion;

a geometric primitive generation means for generating a plurality of geometric primitives from said encoded vertex parameter values according to said arrangement of said vertices within said first surface portion specified by said extent value.

51. A memory media for storing program instructions usable for decompressing 3-D geometry data which represents a first surface portion of a 3-D graphical object, wherein said program instructions are executable to perform the steps of:

receiving said compressed 3-D geometry data, wherein said compressed 3-D geometry data includes vertex parameter values corresponding to vertices within said first surface portion, wherein said compressed 3-D geometry data includes an extent value which specifies an arrangement of said vertices within said first surface portion, and wherein said compressed 3-D geometry data further includes encoded vertex parameter values corresponding to said vertices within said first surface portion;

decoding said extent value to determine said arrangement of said vertices within said first surface portion;

decoding said encoded vertex parameter values corresponding to said vertices within said first surface portion;

generating a plurality of geometric primitives from said encoded vertex parameter values according to said arrangement of said vertices within said first surface portion.

* * * * *